US012699305B2

(12) United States Patent
Chen

(10) Patent No.: US 12,699,305 B2
(45) Date of Patent: Aug. 4, 2026

(54) ACTUATOR DEVICE, PROJECTION DEVICE AND PROJECTION METHOD

(71) Applicant: Coretronic Corporation, Hsin-Chu (TW)

(72) Inventor: Wei-Hao Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 720 days.

(21) Appl. No.: 17/851,049

(22) Filed: Jun. 28, 2022

(65) Prior Publication Data

US 2022/0413357 A1     Dec. 29, 2022

(30) Foreign Application Priority Data

Jun. 29, 2021     (CN) .......................... 202110723801.0

(51) Int. Cl.
*G03B 5/06*          (2021.01)
*G03B 21/14*        (2006.01)
(52) U.S. Cl.
CPC ............. *G03B 5/06* (2013.01); *G03B 21/142* (2013.01)
(58) Field of Classification Search
CPC ................................ G03B 5/06; G03B 21/142
USPC ......................................................... 353/101
See application file for complete search history.

(56) References Cited

U.S. PATENT DOCUMENTS

| | | | |
|---|---|---|---|
| 2020/0371411 A1 | 11/2020 | Chen et al. | |
| 2021/0084266 A1 | 3/2021 | Hu et al. | |
| 2022/0163829 A1* | 5/2022 | Wakabayashi | ......... G02B 26/08 |

FOREIGN PATENT DOCUMENTS

| | | |
|---|---|---|
| CN | 107884896 | 4/2018 |
| CN | 109856898 | 6/2019 |
| CN | 210428058 | 4/2020 |
| CN | 211123621 | 7/2020 |
| TW | I584045 | 5/2017 |
| TW | 202036149 | 10/2020 |

OTHER PUBLICATIONS

"Office Action of China Counterpart Application", issued on Sep. 26, 2025, p. 1-p. 11.

* cited by examiner

*Primary Examiner* — Jerry L Brooks
(74) *Attorney, Agent, or Firm* — JCIPRNET

(57) ABSTRACT

An actuator device, a projection device including the actuator device, and a projection method applicable to the actuator device, are provided. The actuator device includes a base, a frame, an optical element, and at least one driving assembly. The projection method includes the following steps. The frame is disposed in the base, the optical element is disposed in the frame, and the at least one driving assembly is disposed between the base and the frame. The at least one driving assembly is controlled to drive the frame through a first signal, so that the optical element swings reciprocally relative to the base based on a first swing angle, a second swing angle, and a third swing angle of a first actuating shaft.

8 Claims, 13 Drawing Sheets

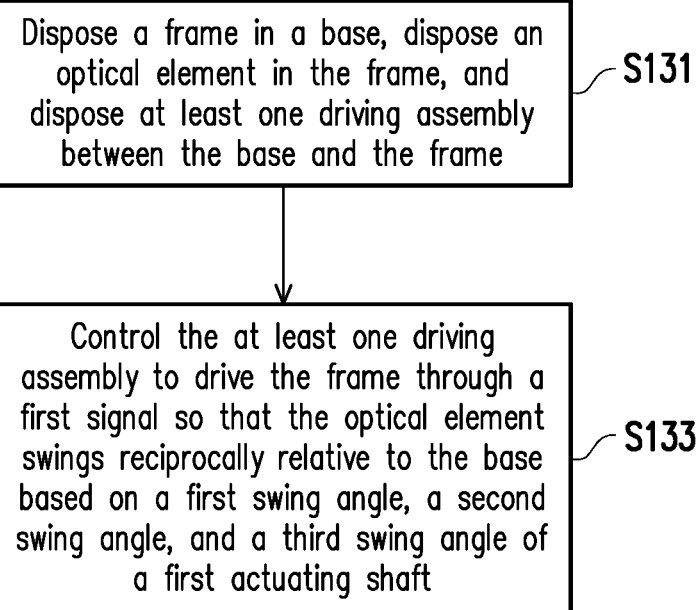

Dispose a frame in a base, dispose an optical element in the frame, and dispose at least one driving assembly between the base and the frame

S131

Control the at least one driving assembly to drive the frame through a first signal so that the optical element swings reciprocally relative to the base based on a first swing angle, a second swing angle, and a third swing angle of a first actuating shaft

ACTUATOR DEVICE, PROJECTION DEVICE AND PROJECTION METHOD

CROSS-REFERENCE TO RELATED APPLICATION

This application claims the priority benefit of China application serial no. 202110723801.0, filed on Jun. 29, 2021. The entirety of the above-mentioned patent application is hereby incorporated by reference herein and made a part of this specification.

BACKGROUND

Technical Field

This disclosure relates to an actuator device, a projection device, and a projection method.

Description of Related Art

With the improvement of cable TV or network streaming video quality, demand by the consumers for high-resolution projectors is gradually increasing. In order to increase the resolution of a projector, an actuator may be disposed at an appropriate position in the projector, so that a beam generated by the projector passes through an optical element on the actuator. When the actuator is activated, the optical element carried by the actuator may swing reciprocally, thereby projecting the beam passing through the optical element to different positions, so as to achieve the effect of increasing the resolution of an image projected by the projector. Single-shaft actuators currently on the market may only increase the resolution of the projector by a factor of two, while dual-shafts actuators may only increase the resolution of the projector by a factor of four. Accordingly, how to improve the actuator to further increase the resolution of the projector remains a challenge for those skilled in the art.

The information disclosed in this background section is only for enhancement of understanding of the background of the described technology and therefore it may contain information that does not form the prior art that is already known to a person of ordinary skill in the art. Furthermore, the information disclosed in this section does not mean that one or more problems to be resolved by one or more embodiments of the disclosure were acknowledged by a person of ordinary skill in the art.

SUMMARY

This disclosure provides an actuator device, a projection device, and a projection method, which can improve resolution of the projection device.

Other objectives and advantages of the disclosure may be further understood from the technical features disclosed in the disclosure.

An embodiment of the disclosure provides an actuator device, which includes a base, a frame, an optical element, at least one driving assembly, and a controller. The frame is disposed in the base. The optical element is disposed in the frame. The at least one driving assembly is disposed between the base and the frame. The controller is coupled to the at least one driving assembly. The controller is configured to control the at least one driving assembly to drive the frame through a first signal, so that the optical element swings reciprocally relative to the base based on a first swing angle, a second swing angle, and a third swing angle of a first actuating shaft.

Another embodiment of the disclosure provides a projection device, which includes an illumination system, a light valve, a projection lens, and an actuator device. The illumination system is configured to emit an illumination beam. The light valve is located on a transmission path of the illumination beam, and the light valve is configured to convert the illumination beam into an image beam. The projection lens is located on a transmission path of the image beam, and the projection lens is configured to project the image beam. The actuator device is located on the transmission path of the image beam, and the actuator device is disposed between the light valve and the projection lens or in the projection lens. The actuator device includes a base, a frame, an optical element, and at least one driving assembly, and a controller. The frame is disposed in the base. The optical element is disposed in the frame. The at least one driving assembly is disposed between the base and the frame. The controller is coupled to the at least one driving assembly. The controller is configured to control the at least one driving assembly to drive the frame through a first signal, so that the optical element swings reciprocally relative to the base based on a first swing angle, a second swing angle, and a third swing angle of a first actuating shaft.

Another embodiment of the disclosure provides a projection method, which is applicable to an actuator device. The actuator device includes a base, a frame, an optical element, and at least one driving assembly. The projection method includes the following steps. The frame is disposed in the base, the optical element is disposed in the frame, and the at least one driving assembly is disposed between the base and the frame. The at least one driving assembly is controlled to drive the frame through a first signal, so that the optical element swings reciprocally relative to the base based on a first swing angle, a second swing angle, and a third swing angle of a first actuating shaft.

Based on the above, the embodiments of the disclosure have at least one of the following advantages. In the embodiments of the disclosure, the optical element of the actuator device of the disclosure may swing reciprocally based on at least three swing angles of a single actuating shaft, thereby increasing the resolution of the projection device.

Other objectives, features and advantages of the disclosure can be further understood from the further technological features disclosed by the embodiments of the disclosure wherein there are shown and described preferred embodiments of the disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the descriptions, serve to explain the principles of the disclosure.

FIG. 11A is a schematic diagram of a pixel generated using the actuator device in FIG. 7 according to another embodiment of the disclosure.

FIG. 11B is a schematic diagram of a signal generated by the controller using the actuator device in FIG. 7 according to another embodiment of the disclosure.

FIG. 13 shows a flowchart of a projection method according to an embodiment of the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The usage of "including", "comprising", or "having", and variations thereof herein is meant to encompass the items listed thereafter and equivalents thereof as well as additional items. Unless limited otherwise, the terms "connected", "coupled", and "mounted", and variations thereof herein are used broadly and encompass direct and indirect connections, couplings, and mountings.

Figure 1A:
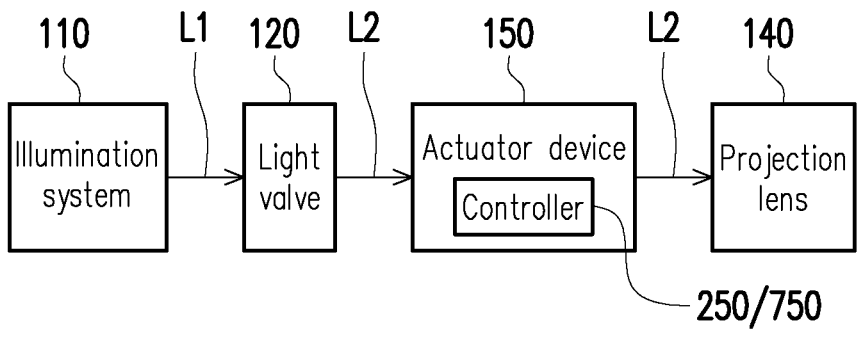
FIG. 1A shows a schematic diagram of a projection device according to an embodiment of the disclosure.

FIG. 1A shows a schematic diagram of a projection apparatus 100A according to an embodiment of the disclosure. The projection device 100A may include an illumination system 110, a light valve 120, a projection lens 140, and an actuator device 150.

The illumination system 110 may be configured to provide an illumination beam L1. The light valve 120 is located on a transmission path of the illumination beam L1. The light valve 120 may be configured to convert the illumination beam L1 into an image beam L2. The light valve 120 is, for example, a reflective light modulator such as a liquid crystal on silicon panel (LCoS panel) or a digital micromirror device (DMD). The light valve 120 may also be, for example, a transmissive optical modulator such as a transparent liquid crystal panel, an electro-optical modulator, a magneto-optic modulator, or an acousto-optic modulator (AOM). The projection lens 140 is located on a transmission path of the image beam L2. The projection lens 140 may be configured to project the image beam L2. For example, the projection lens 140 may project the image beam L2 onto a wall or a screen outside the projection device 100A. The projection lens 140 is, for example, a combination of one or more optical lenses having refractive power. For example, the projection lens 140 may include a combination of non-flat lenses such as a biconcave lens, a biconvex lens, a meniscus lens, a convex-concave lens, a plano-convex lens, or a plano-concave lens. In an embodiment, the projection lens 140 may also include a flat optical lens. The actuator device 150 is located on the transmission path of the image beam L2, and the actuator device 150 may be disposed between the light valve 120 and the projection lens 140. The actuator device 150 may include an optical element. The optical element may be configured to increase resolution of the image beam. In another embodiment, the actuator device 150 may be disposed in the projection lens 140 (not shown in the figure).

Figure 1B:
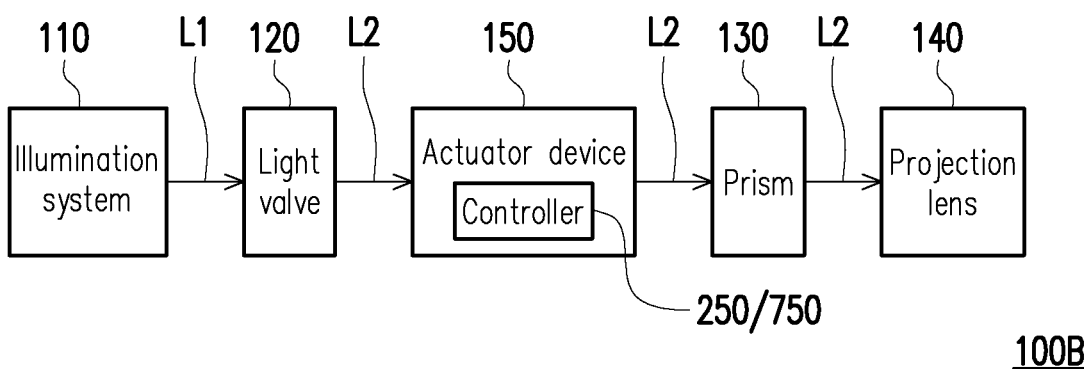
FIGS. 1B and 1C respectively show schematic diagrams of other projection devices according to other embodiments of the disclosure.
Figure 1C:
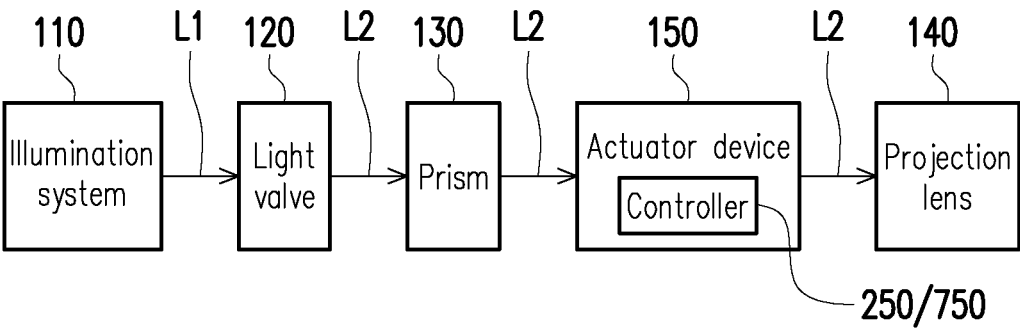

FIG. 1B and FIG. 1C respectively show schematic diagrams of a projection device 100B and a projection device 100C according to other embodiments of the disclosure. With reference to FIGS. 1A to 1C, the projection device 100B in FIG. 1B and the projection device 100C in FIG. 1C are similar to the projection device 100A in FIG. 1A, and differences between the projection devices 100B and 100C and the projection device 100A are further described as follows. Similar elements are represented by the same reference numerals, which are not repeated here. In the embodiment of FIG. 1A, the projection device 100A may be non-telecentric. The non-telecentric projection device 100A in FIG. 1A may not include a prism. In the embodiments in FIGS. 1B and 1C, the projection devices 100B and 100C may be telecentric. Compared to the non-telecentric projection device 100A, the telecentric projection devices 100B and 100C may further include a prism 130. The prism 130 of the projection devices 100B and 100C is located on the transmission path of the image beam L2, and the prism 130 may be disposed between the light valve 120 and the projection lens 140. In the embodiment of FIG. 1B, the actuator device 150 may be disposed between the light valve 120 and the prism 130, and in the embodiment of FIG. 1C, the actuator device 150 may be disposed between the prism 130 and the projection lens 140. In addition, under the architecture of the telecentric projection device 100C, in other embodiments not shown, the actuator device 150 may also be disposed in the projection lens 140.

Figure 2:
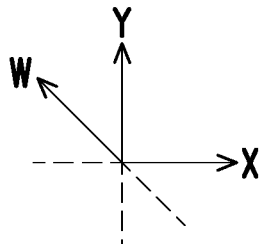
FIG. 2 shows a top view of an actuator device having a single shaft according to an embodiment of the disclosure.
Figure 2:
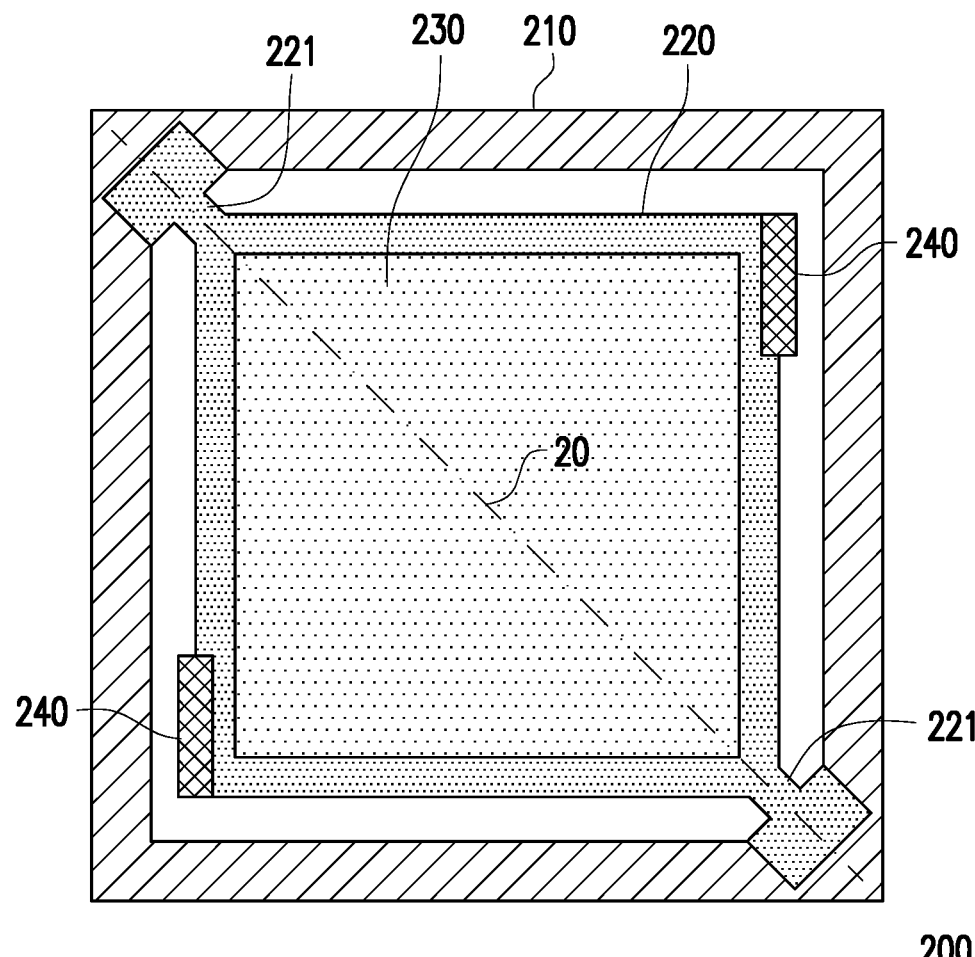

The actuator device 150 in FIGS. 1A to 1C is, for example, an actuator device 200 having a single shaft in FIG. 2. In other words, the actuator device 200 in FIG. 2 may be applied to any one of the projection device 100A in FIG. 1A to the projection device 100C in FIG. 1C. Alternatively, the actuator device 200 in FIG. 2 may also be disposed in the projection lens 140 in FIG. 1A or 1C. FIG. 2 shows a top view of the actuator device 200 having a single shaft according to an embodiment of the disclosure. The actuator device 200 may include a base 210, a frame 220, an optical element 230, and a controller 250 (shown in FIGS. 1A to 1C). The frame 220 may be disposed in the base 210, and the optical element 230 may be disposed in the frame 220. The frame 220 may be connected to the base 210 through a rotating shaft 221.

The actuator device 200 may further include one or more driving assembly 240 disposed between the base 210 and the frame 220. The driving assembly 240 is, for example, a voice coil motor or a piezoelectric material, but the disclosure is not limited thereto. The controller 250 may be coupled to the driving assembly 240, and may be configured to control the driving assembly 240 to drive the frame 220 through a signal, so that the optical element 230 swings reciprocally relative to the base 210 based on an actuating shaft 20 (that is, the actuating shaft 20 serves as a rotating shaft). In the embodiment, it is assumed that the actuating shaft 20 is parallel to a W direction, where the W direction may be parallel to an angular bisector of a negative X-axis direction and a Y-axis direction (or an angular bisector of an X-axis direction and the Y-axis direction). The number of driving assembly 240 is, for example, 1, 2, or N (N is any positive integer). When the number of the driving assembly 240 is two, the two driving assemblies 240 may be respectively disposed on two opposite sides of the actuating shaft 20.

Figure 3A:
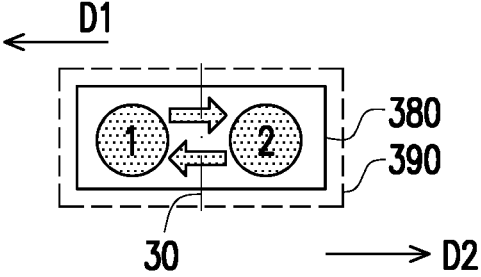
FIG. 3A is a schematic diagram of a pixel generated using the actuator device in FIG. 2 according to a comparative example of the related art.
Figure 3B:
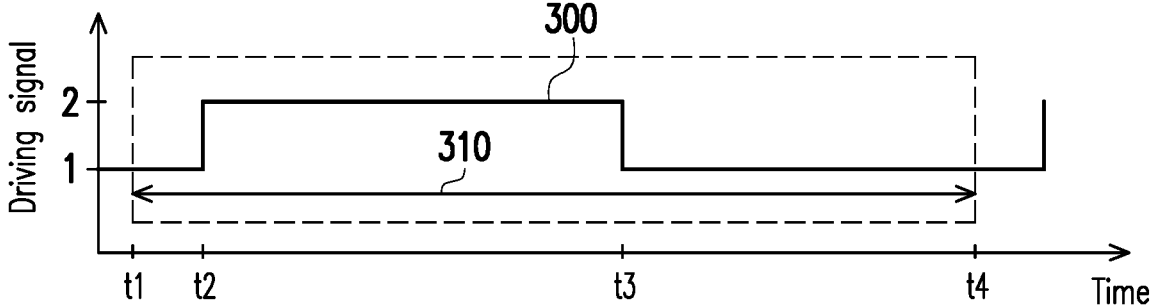
FIG. 3B is a schematic diagram of a signal generated by the controller using the actuator device in FIG. 2 according to a comparative example of the related art.

FIG. 3A is a schematic diagram of a pixel 380 generated using the actuator device 200 in FIG. 2 according to a comparative example of the related art. FIG. 3B is a schematic diagram of a signal 300 generated by a controller using the actuator device 200 in FIG. 2 according to a comparative example of the related art, in which the signal 300 may be a digital signal or an analog signal. With reference to FIGS. 2, 3A and 3B, the controller (not shown in the figure) may be configured to control the driving assembly 240 to drive the frame 220 through the signal 300, so that the optical element 230 swings reciprocally relative to the base 210 based on the actuating shaft 20. When the optical element 230 swings reciprocally relative to the base 210 based on the actuating shaft 20, the image beam passing through the optical element 230 may be transmitted to a virtual plane 390 to form a moving light spot on the virtual plane 390. The image beam passing through the optical element 230 forms a light spot on the virtual plane 390 that moves in an order of a position 1 to a position 2, and the moving light spot forms the pixel 380.

Specifically, the signal 300 may include a driving signal 1 corresponding to the position 1 and a driving signal 2 corresponding to the position 2. The driving signal 1 and the driving signal 2 may respectively correspond to different driving currents (that is, different current intensities) or different driving voltages (that is, different voltage levels). When the controller sends the driving signal 1 to the driving assembly 240, the driving assembly 240 may drive the frame 220 to swing the optical element 230 based on a first swing angle of the actuating shaft 20, in which the first swing angle corresponds to the driving signal 1. When the optical element 230 swings based on the first swing angle of the actuating shaft 20, the light spot formed on the virtual plane 390 by the image beam passing through the optical element 230 may move in a radial direction D1 of an axis 30 and remain in the position 1. The axis 30 may be an axis corresponding to the actuating shaft 20 on the virtual plane 390. On the other hand, when the controller sends the driving signal 2 to the driving assembly 240, the driving assembly 240 may drive the frame 220 to swing the optical element 230 based on a second swing angle of the actuating shaft 20, in which the second swing angle corresponds to the driving signal 2. When the optical element 230 swings based on the second swing angle of the actuating shaft 20, the light spot formed on the virtual plane 390 by the image beam passing through the optical element 230 may move in a radial direction D2 of the axis 30 and remain in the position 2. The radial direction D2 is opposite to the radial direction D1.

A time interval 310 may be a period for generating the pixel 380. Taking the time interval 310 as an example, at a time point t1, the controller may drive the frame 220 through the driving signal 1, so that the optical element 230 maintains swinging based on the first swing angle of the actuating shaft 20. Therefore, the light spot formed on the virtual plane 390 by the image beam passing through the optical element 230 may remain in the position 1.

At a time point t2, the controller may drive the frame 220 through the driving signal 2, so that the optical element 230 swings based on the second swing angle of the actuating shaft 20. Therefore, the light spot formed on the virtual plane 390 by the image beam passing through the optical element 230 may move and remain in the position 2.

At a time point t3, the controller may drive the frame 220 through the driving signal 1, so that the optical element 230 swings based on the first swing angle of the actuating shaft 20. Therefore, the light spot formed on the virtual plane 390 by the image beam passing through the optical element 230 may move and remain in the position 1.

At a time point t4, the controller may drive the frame 220 through the driving signal 2, so that the optical element 230 maintains swinging based on the first swing angle of the actuating shaft 20. Therefore, the light spot formed on the virtual plane 390 by the image beam passing through the optical element 230 may remain in the position 1.

As can be seen from the comparative examples of FIGS. 3A and 3B, the controller controls the driving assembly 240 to drive the frame 220 through the signal 300, so that the optical element 230 swings reciprocally relative to the base 210 based on the only two swing angles of the actuating shaft 20. This enables the light spot formed by the image beam on the virtual plane 390 to move between at most two positions, thereby increasing the resolution of the image beam. However, the resolution that can be increased by the above-mentioned related art is limited. When a number of the swing angles of the actuating shaft of the single-shaft actuator device is increased, that is, increasing the positions in which the actuating shaft of the single-shaft actuator device may remain in, the resolution of the image beam of the projection device is further improved.

Figure 4A:
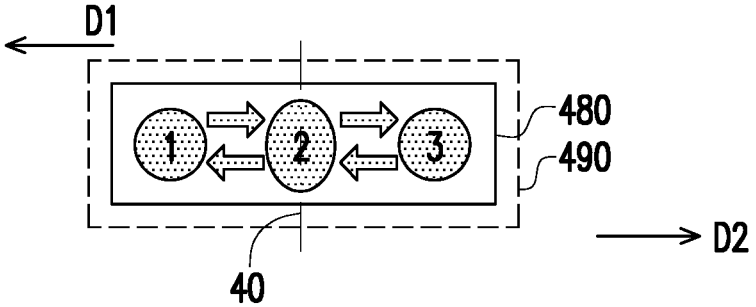
FIG. 4A is a schematic diagram of a pixel generated using the actuator device in FIG. 2 according to an embodiment of the disclosure.
Figure 4B:
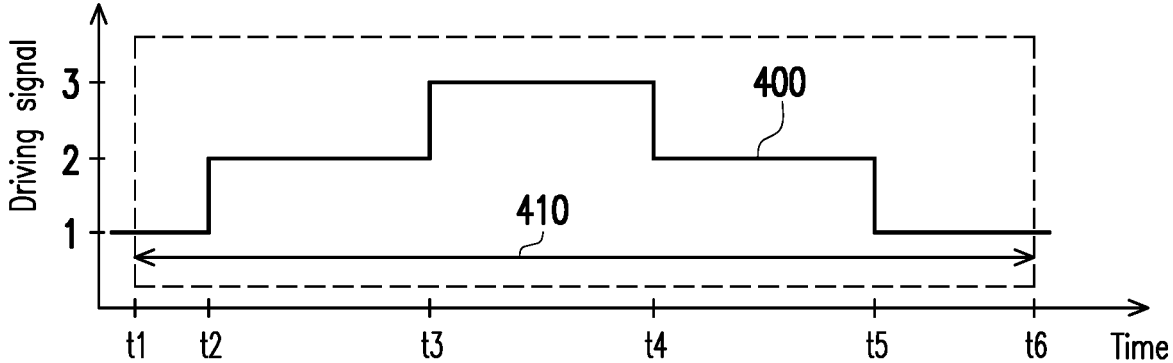
FIG. 4B is a schematic diagram of a signal generated by the controller using the actuator device in FIG. 2 according to an embodiment of the disclosure.

In an embodiment of the disclosure, the controller 250 (shown in FIGS. 1A to 1C) may control the driving assembly 240 to drive the frame 220 through a signal, so that the optical element 230 swings reciprocally relative to the base 210 based on at least three swing angles of the actuating shaft 20. FIG. 4A is a schematic diagram of a pixel 480 generated using the actuator device 200 in FIG. 2 according to an embodiment of the disclosure. FIG. 4B is a schematic diagram of a signal 400 generated by the controller 250 using the actuator device 200 in FIG. 2 according to an embodiment of the disclosure, where the signal 400 may be an analog signal. With reference to FIGS. 1A to 1C, FIG. 2, and FIGS. 4A, and 4B, the controller 250 (shown in FIGS. 1A to 1C) may be configured to control the driving assembly 240 to drive the frame 220 through the signal 400 (for example, a first signal), so that the optical element 230 swings relative to the base 210 based on an order of the first swing angle, the second swing angle, and a third swing angle of the actuating shaft 20 (for example, a first actuating shaft). When the optical element 230 swings relative to the base 210 based on the order of the first swing angle, the second swing angle, and the third swing angle of the actuating shaft 20, the image beam passing through the optical element 230 may be transmitted to the virtual plane 490 to form a light spot on the virtual plan 490 that moves in an order of the position 1, the position 2, and a position 3, thereby forming the pixel 480 through the moving light spot.

Specifically, the signal 400 may include the driving signal 1 corresponding to the position 1 and the first swing angle, the driving signal 2 corresponding to the position 2 and the second swing angle, and a driving signal 3 corresponding to the position 3 and the third swing angle. The driving signal 1, the driving signal 2, and the driving signal 3 may respectively correspond to different driving currents (that is, different current intensities) or correspond to different driving voltages (that is, different voltage levels). When the controller 250 sends the driving signal 1 to the driving assembly 240, the driving assembly 240 may drive the frame 220, so that the optical element 230 swings based on the first swing angle of the actuating shaft 20, in which the first swing angle corresponds to the driving signal 1. When the optical element 230 swings based on the first swing angle of the actuating shaft 20, the light spot formed on the virtual plane 490 by the image beam passing through the optical element 230 may move in the radial direction D1 of an axis 40 and remain in the position 1. The axis 40 may be an axis corresponding to the actuating shaft 20 on the virtual plane 490. In addition, when the controller 250 sends the driving signal 2 to the driving assembly 240, the driving assembly 240 may drive the frame 220, so that the optical element 230 swings based on the second swing angle of the actuating shaft 20, in which the second swing angle corresponds to the driving signal 2. When the optical element 230 swings based on the second swing angle of the actuating shaft 20, the light spot formed on the virtual plane 490 by the image beam passing through the optical element 230 may move in the radial direction D2 of the axis 40 and remain in the position 2. The radial direction D2 is opposite to the radial direction D1. Furthermore, when the controller 250 sends the driving signal 3 to the driving assembly 240, the driving assembly 240 may drive the frame 220, so that the optical element 230 swings based on the third swing angle of the actuating shaft 20, in which the third swing angle corresponds to the driving signal 3. When the optical element 230 swings based on the third swing angle of the actuating shaft 20, the light spot formed on the virtual plane 490 by the image beam passing through the optical element 230 may move in the radial direction D2 of the axis 40 and remain in the position 3. In addition, in the embodiment, when the controller 250 sends the driving signal 2 to the driving assembly 240, the driving assembly 240 may also drive the frame 220, so that the optical element 230 changes swinging from the third swing angle to the second swing angle based on the actuating shaft 20. At this time, the light spot formed on the virtual plane 490 by the image beam passing through the optical element 230 may move in the radial direction D1 of the axis 40 and remain in the position 2.

In another embodiment of the disclosure, the swing angle based on the actuating shaft 20 may be proportional to a driving current (or a driving voltage) of the driving signal. For example, it is assumed that the third swing angle is greater than the second swing angle, and the second swing angle is greater than the first swing angle. In other words, the second swing angle is between the first swing angle and the third swing angle. Accordingly, a driving current (or a driving voltage) of the driving signal 3 may be greater than a driving current (or a driving voltage) of the driving signal 2, and the driving current (or the driving voltage) of the driving signal 2 may be greater than a driving current (or a driving voltage) of the driving signal 1.

A time interval 410 may be a period for generating the pixel 480. Taking the time interval 410 as an example, at a time point t1, the controller 250 may drive the frame 220 through the driving signal 1, so that the optical element 230 maintains swinging based on the first swing angle of the actuating shaft 20. Therefore, the light spot formed on the virtual plane 490 by the image beam passing through the optical element 230 may remain in the position 1.

At a time point t2, the controller 250 may drive the frame 220 through the driving signal 2, so that the optical element 230 swings based on the second swing angle of the actuating shaft 20. Therefore, the light spot formed on the virtual plane 490 by the image beam passing through the optical element 230 may move and remain in the position 2.

At a time point t3, the controller 250 may drive the frame 220 through the driving signal 3, so that the optical element 230 swings based on the third swing angle of the actuating shaft 20. Therefore, the light spot formed on the virtual plane 490 by the image beam passing through the optical element 230 may move and remain in the position 3.

At a time point t4, the controller 250 may drive the frame 220 through the driving signal 2, so that the optical element 230 swings based on the second swing angle of the actuating shaft 20. Therefore, the light spot formed on the virtual plane 490 by the image beam passing through the optical element 230 may move and remain in the position 2.

At a time point t5, the controller 250 may drive the frame 220 through the driving signal 1, so that the optical element 230 swings based on the first swing angle of the actuating shaft 20. Therefore, the light spot formed on the virtual plane 490 by the image beam passing through the optical element 230 may move and remain in the position 1.

At a time point t6, the controller 250 may drive the frame 220 through the driving signal 1, so that the optical element 230 swings based on the first swing angle of the actuating shaft 20. Therefore, the light spot formed on the virtual plane 490 by the image beam passing through the optical element 230 may remain in the position 1.

Figure 5A:
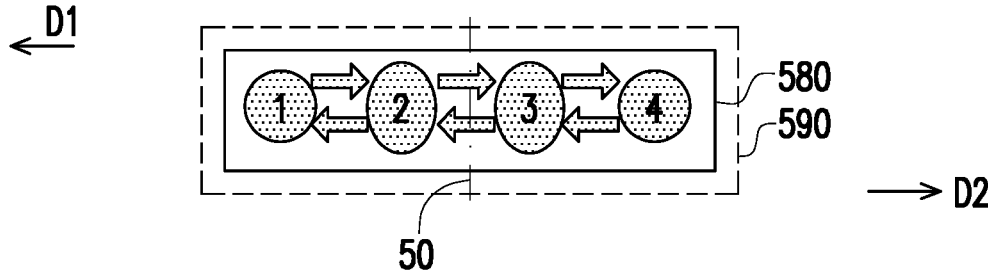
FIG. 5A is a schematic diagram of a pixel generated using the actuator device in FIG. 2 according to another embodiment of the disclosure.
Figure 5B:
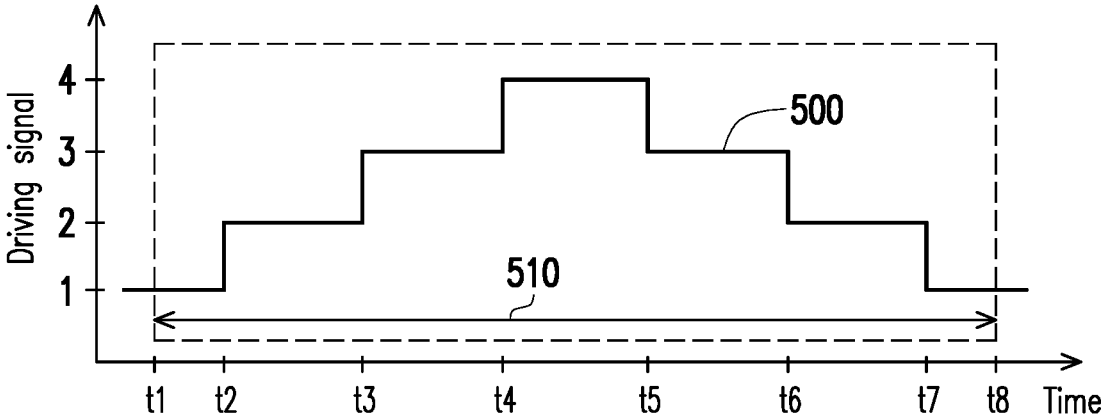
FIG. 5B is a schematic diagram of a signal generated by the controller using the actuator device in FIG. 2 according to another embodiment of the disclosure.

FIG. 5A is a schematic diagram of a pixel 580 generated using the actuator device 200 in FIG. 2 according to another embodiment of the disclosure. FIG. 5B is a schematic diagram of a signal 500 generated by the controller 250 using the actuator device 200 in FIG. 2 according to another embodiment of the disclosure, where the signal 500 may be an analog signal. With reference to FIGS. 1A to 1C, FIG. 2, and FIGS. 5A and 5B, the controller 250 (shown in FIGS. 1A to 1C) may be configured to control the driving assembly 240 to drive the frame 220 through the signal 500 (for example, the first signal), so that the optical element 230 swings relative to the base 210 based on an order of the first swing angle, the second swing angle, the third swing angle, and a fourth swing angle of the actuating shaft 20 (for example, the first actuating shaft). When the optical element 230 swings relative to the base 210 based on the order of the first swing angle, the second swing angle, the third swing angle, and the fourth swing angle of the actuating shaft 20, the image beam passing through the optical element 230 may be transmitted to the virtual plane 590 to form a light spot on the virtual plane 590 that moves in an order of the position 1, the position 2, the position 3, and a position 4, thereby forming the pixel 580 through the moving light spot.

Specifically, the signal 500 may include the driving signal 1 corresponding to the position 1 and the first swing angle, the driving signal 2 corresponding to the position 2 and the second swing angle, the driving signal 3 corresponding to the position 3 and the third swing angle, and a driving signal 4 corresponding to the position 4 and the fourth swing angle. The driving signal 1, the driving signal 2, the driving signal 3, and the driving signal 4 may respectively correspond to different driving currents (that is, different current intensities) or correspond to different driving voltages (that is, different voltage levels). When the controller 250 sends the driving signal 1 to the driving assembly 240, the driving assembly 240 may drive the frame 220, so that the optical element 230 swings based on the first swing angle of the actuating shaft 20, in which the first swing angle corresponds to the driving signal 1. When the optical element 230 swings based on the first swing angle of the actuating shaft 20, the light spot formed on the virtual plane 590 by the image beam passing through the optical element 230 may move in the radial direction D1 of an axis 50 and remain in the position 1. The axis 50 may be an axis corresponding to the actuating shaft 20 on the virtual plane 590. In addition, when the controller 250 sends the driving signal 2 to the driving assembly 240, the driving assembly 240 may drive the frame 220, so that the optical element 230 swings based on the second swing angle of the actuating shaft 20, in which the second swing angle corresponds to the driving signal 2. When the optical element 230 swings based on the second swing angle of the actuating shaft 20, the light spot formed on the virtual plane 590 by the image beam passing through the optical element 230 may move in the radial direction D2 of the axis 50 and remain in the position 2. The radial direction D2 is opposite to the radial direction D1. Furthermore, when the controller 250 sends the driving signal 3 to the driving assembly 240, the driving assembly 240 may drive the frame 220, so that the optical element 230 swings based on the third swing angle of the actuating shaft 20, in which the third swing angle corresponds to the driving signal 3. When the optical element 230 swings based on the third swing angle of the actuating shaft 20, the light spot formed on the virtual plane 590 by the image beam passing through the optical element 230 may move in the radial direction D2 of the axis 50 and remain in the position 3. On the other hand, when the controller 250 sends the driving signal 4 to the driving assembly 240, the driving assembly 240 may drive the frame 220, so that the optical element 230 swings based on the fourth swing angle of the actuating shaft 20, in which the fourth swing angle corresponds to the driving signal 4. When the optical element 230 swings based on the fourth swing angle of the actuating shaft 20, the light spot formed on the virtual plane 590 by the image beam passing through the optical element 230 may move in the radial direction D2 of the axis 50 and remain in the position 4. In addition, in the embodiment, when the controller 250 sends the driving signal 2 to the driving assembly 240, the driving assembly 240 may also drive the frame 220, so that the optical element 230 changes swinging from the third swing angle to the second swing angle based on the actuating shaft 20. At this time, the light spot formed on the virtual plane 590 by the image beam passing through the optical element 230 may move in the radial direction D1 of the axis 50 and remain in the position 2. On the other hand, when the controller 250 sends the driving signal 3 to the driving assembly 240, the driving assembly 240 may also drive the frame 220, so that the optical element 230 changes swinging from the fourth swing angle to the third swing angle based on the actuating shaft 20. At this time, the light spot formed on the virtual plane 590 by the image beam passing through the optical element 230 may move in the radial direction D1 of the axis 50 and remain in the position 3.

In an embodiment, the swing angle based on the actuating shaft 20 may be proportional to the driving current (or the driving voltage) of the driving signal. For example, it is assumed that the fourth swing angle is greater than the third swing angle, the third swing angle is greater than the second swing angle, and the second swing angle is greater than the first swing angle. In other words, the second swing angle is between the first swing angle and the third swing angle, and the third swing angle is between the second swing angle and the fourth swing angle. Accordingly, a driving current (or a driving voltage) of the driving signal 4 may be greater than the driving current (or the driving voltage) of the driving signal 3, and the driving current (or the driving voltage) of the driving signal 3 may be greater than the driving current (or the driving voltage) of the driving signal 2, and the driving current (or the driving voltage) of the driving signal 2 may be greater than the driving current (or the driving voltage) of the driving signal 1.

A time interval 510 may be a period for generating the pixel 580. Taking the time interval 510 as an example, at a time point t1, the controller 250 may drive the frame 220 through the driving signal 1, so that the optical element 230 maintains swinging based on the first swing angle of the actuating shaft 20. Therefore, the light spot formed on the virtual plane 590 by the image beam passing through the optical element 230 may remain in the position 1.

At a time point t2, the controller 250 may drive the frame 220 through the driving signal 2, so that the optical element 230 swings based on the second swing angle of the actuating shaft 20. Therefore, the light spot formed on the virtual plane 590 by the image beam passing through the optical element 230 may move and remain in the position 2.

At a time point t3, the controller 250 may drive the frame 220 through the driving signal 3, so that the optical element 230 swings based on the third swing angle of the actuating shaft 20. Therefore, the light spot formed on the virtual plane 590 by the image beam passing through the optical element 230 may move and remain in the position 3.

At a time point t4, the controller 250 may drive the frame 220 through the driving signal 4, so that the optical element 230 swings based on the fourth swing angle of the actuating shaft 20. Therefore, the light spot formed on the virtual plane 590 by the image beam passing through the optical element 230 may move and remain in the position 4.

At a time point t5, the controller 250 may drive the frame 220 through the driving signal 3, so that the optical element 230 swings based on the third swing angle of the actuating shaft 20. Therefore, the light spot formed on the virtual plane 590 by the image beam passing through the optical element 230 may move and remain in the position 3.

At a time point t6, the controller 250 may drive the frame 220 through the driving signal 2, so that the optical element 230 swings based on the second swing angle of the actuating shaft 20. Therefore, the light spot formed on the virtual plane 590 by the image beam passing through the optical element 230 may move and remain in the position 2.

At a time point t7, the controller 250 may drive the frame 220 through the driving signal 1, so that the optical element 230 swings based on the first swing angle of the actuating shaft 20. Therefore, the light spot formed on the virtual plane 590 by the image beam passing through the optical element 230 may move and remain in the position 1.

At a time point t8, the controller 250 may drive the frame 220 through the driving signal 1, so that the optical element 230 maintains swinging based on the first swing angle of the actuating shaft 20. Therefore, the light spot formed on the virtual plane 590 by the image beam passing through the optical element 230 may remain in the position 1.

Figure 6A:
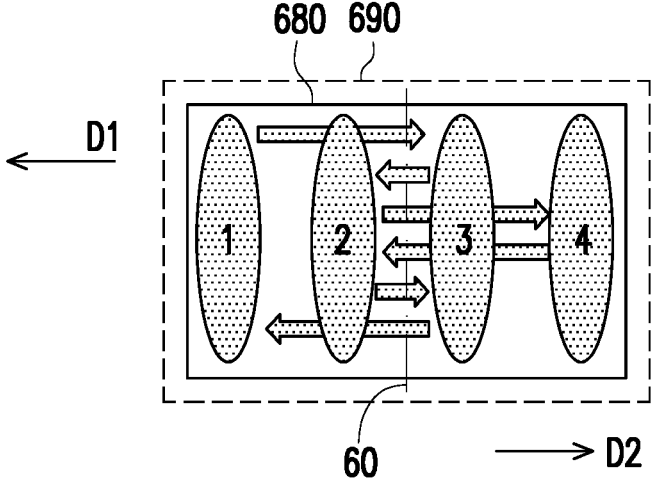
FIG. 6A is a schematic diagram of a pixel generated using the actuator device in FIG. 2 according to another embodiment of the disclosure.
Figure 6B:
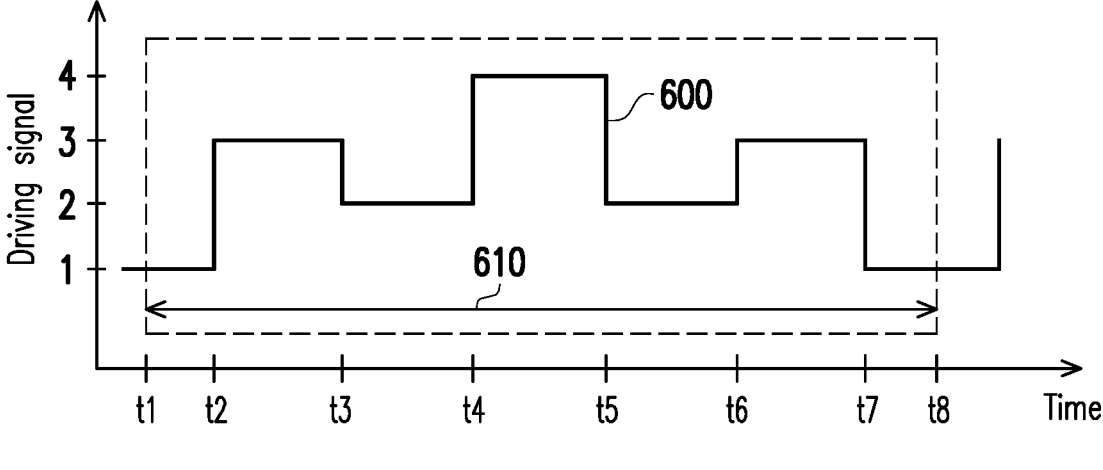
FIG. 6B is a schematic diagram of a signal generated by the controller using the actuator device in FIG. 2 according to another embodiment of the disclosure.

In another embodiment of the disclosure, the controller 250 (shown in FIGS. 1A to 1C) may control the driving assembly 240 to drive the frame 220 through a signal, so that the optical element 230 swings relative to the base 210 based on an order same as or different from a specific order of the actuating shaft 20. The specific order is, for example, the first swing angle, the second swing angle, the third swing angle, and the fourth swing angle. FIG. 6A is a schematic diagram of a pixel 680 generated using the actuator device 200 in FIG. 2 according to another embodiment of the disclosure. FIG. 6B is a schematic diagram of a signal 600 generated by the controller 250 using the actuator device 200 in FIG. 2 according to another embodiment of the disclosure, where the signal 600 may be an analog signal. With reference to FIGS. 1A to 1C, FIG. 2, and FIGS. 6A, and 6B, the controller 250 (shown in FIGS. 1A to 1C) may be configured to control the driving assembly 240 to drive the frame 220 through the signal 600 (for example, the first signal), so that the optical element 230 swing relative to the base 210 based on an order of the first swing angle, the third swing angle, the second swing angle, and the fourth swing angle of the actuating shaft 20 (for example, the first actuating shaft). When the optical element 230 swings relative to the base 210 based on the order of the first swing angle, the third swing angle, the second swing angle, and the fourth swing angle of the actuating shaft 20, the image beam passing through the optical element 230 may be transmitted to the virtual plane 690 to form a light spot on the virtual plane 690 that moves in an order of the position 1, the position 3, the position 2 and the position 4, thereby forming the pixel 680 through the moving light spot.

Specifically, the signal 600 may include the driving signal 1 corresponding to the position 1 and the first swing angle, the driving signal 2 corresponding to the position 2 and the second swing angle, the driving signal 3 corresponding to the position 3 and the third swing angle, and the driving signal 4 corresponding to the position 4 and the fourth swing angle. The driving signal 1, the driving signal 2, the driving signal 3, and the driving signal 4 may respectively correspond to different driving currents (that is, different current intensities) or correspond to different driving voltages (that is, different voltage levels). When the controller 250 sends the driving signal 1 to the driving assembly 240, the driving assembly 240 may drive the frame 220, so that the optical element 230 swings based on the first swing angle of the actuating shaft 20, in which the first swing angle corresponds to the driving signal 1. When the optical element 230 swings based on the first swing angle of the actuating shaft 20, the light spot formed on the virtual plane 690 by the image beam passing through the optical element 230 may move in the radial direction D1 of the axis 60 and remain in the position 1. The axis 60 may be an axis corresponding to the actuating shaft 20 on the virtual plane 690. Then, when the controller 250 sends the driving signal 3 to the driving assembly 240, the driving assembly 240 may drive the frame 220, so that the optical element 230 swings based on the third swing angle of the actuating shaft 20, in which the third swing angle corresponds to the driving signal 3. When the optical element 230 swings based on the third swing angle of the actuating shaft 20, the light spot formed on the virtual plane 690 by the image beam passing through the optical element 230 may move in the radial direction D2 of the axis 60 and remain in the position 3. The radial direction D2 is opposite to the radial direction D1. Then, when the controller 250 sends the driving signal 2 to the driving assembly 240, the driving assembly 240 may drive the frame 220, so that the optical element 230 swings based on the second swing angle of the actuating shaft 20, in which the second swing angle corresponds to the driving signal 2. When the optical element 230 swings based on the second swing angle of the actuating shaft 20, the light spot formed on the virtual plane 690 by the image beam passing through the optical element 230 may move in the radial direction D1 of the axis 60 and remain in the position 2. Finally, when the controller 250 sends the driving signal 4 to the driving assembly 240, the driving assembly 240 may drive the frame 220, so that the optical element 230 swings based on the fourth swing angle of the actuating shaft 20, in which the fourth swing angle corresponds to the driving signal 4. When the optical element 230 swings based on the fourth swing angle of the actuating shaft 20, the light spot formed on the virtual plane 690 by the image beam passing through the optical element 230 may move in the radial direction D2 of the axis 60 and remain in the position 4.

A time interval 610 may be a period for generating the pixel 680. Taking the time interval 610 as an example, at a time point t1, the controller 250 may drive the frame 220 through the driving signal 1, so that the optical element 230 maintains swinging based on the first swing angle of the actuating shaft 20. Therefore, the light spot formed on the virtual plane 690 by the image beam passing through the optical element 230 may remain in the position 1.

At a time point t2, the controller 250 may drive the frame 220 through the driving signal 3, so that the optical element 230 swings based on the third swing angle of the actuating shaft 20. Therefore, the light spot formed on the virtual plane 690 by the image beam passing through the optical element 230 may move and remain in the position 3.

At a time point t3, the controller 250 may drive the frame 220 through the driving signal, so that the optical element 230 swings based on the second swing angle of the actuating shaft 20. Therefore, the light spot formed on the virtual plane 690 by the image beam passing through the optical element 230 may move and remain in the position 2.

At a time point t4, the controller 250 may drive the frame 220 through the driving signal 4, so that the optical element 230 swings based on the fourth swing angle of the actuating shaft 20. Therefore, the light spot formed on the virtual plane 690 by the image beam passing through the optical element 230 may move and remain in the position 4.

At a time point t5, the controller 250 may drive the frame 220 through the driving signal 2, so that the optical element 230 swings based on the second swing angle of the actuating shaft 20. Therefore, the light spot formed on the virtual plane 690 by the image beam passing through the optical element 230 may move and remain in the position 2.

At a time point t6, the controller 250 may drive the frame 220 through the driving signal 3, so that the optical element 230 swings based on the third swing angle of the actuating shaft 20. Therefore, the light spot formed on the virtual plane 690 by the image beam passing through the optical element 230 may move and remain in the position 3.

At a time point t7, the controller 250 may drive the frame 220 through the driving signal 1, so that the optical element 230 swings based on the first swing angle of the actuating shaft 20. Therefore, the light spot formed on the virtual plane 690 by the image beam passing through the optical element 230 may move and remain in the position 1.

At a time point t8, the controller 250 may drive the frame 220 through the driving signal 1, so that the optical element 230 maintains swinging based on the first swing angle of the actuating shaft 20. Therefore, the light spot formed on the virtual plane 690 by the image beam passing through the optical element 230 may remain in the position 1.

From the embodiment of the disclosure shown in FIGS. 4A to 6B, it can be seen that the actuator device 200 having the single shaft may enable the light spot formed on the virtual plane 490 by the image beam through the various driving methods controlled by the above-mentioned controller 250 to move among the three positions, so as to form the pixel 480, or enable the light spot formed on the virtual planes 590 and 690 by the image beam to respectively move between the four positions, so as to form the pixels 580 and 680. For the case of using a single-shaft actuator device, compared to the comparative example of FIGS. 3A and 3B, in which the light spot may only move between at most two positions, the embodiment of the disclosure can further increase the resolution of the image beam.

Figure 7:
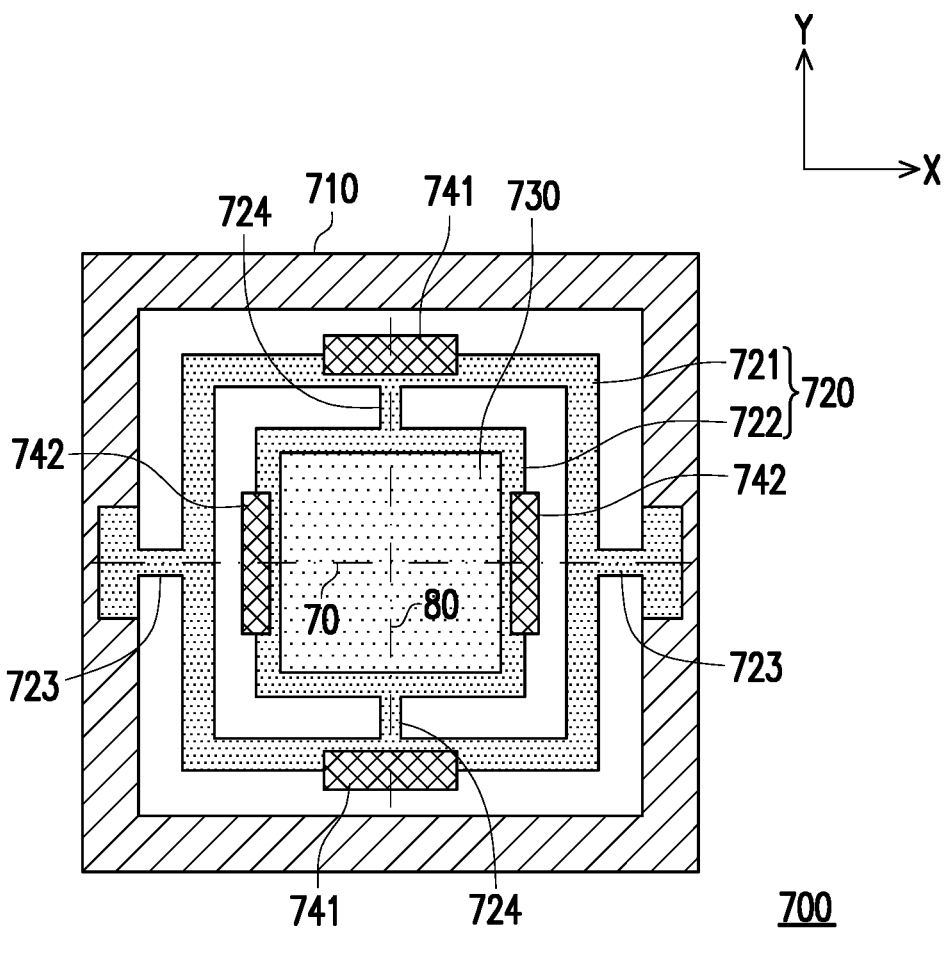
FIG. 7 shows a top view of an actuator device having dual shafts according to another embodiment of the disclosure.

The actuator device 150 in FIGS. 1A to 1C may also be, for example, an actuator device 700 having dual shafts. In other words, the actuator device 700 in FIG. 7 may be applied to any one of the projection device 100A in FIG. 1A to the projection device 100C in FIG. 1C. Alternatively, the actuator device 700 in FIG. 7 may also be disposed in the projection lens 140 in FIG. 1A or 1C. FIG. 7 shows a top view of the actuator device 700 having dual shafts according to another embodiment of the disclosure. The actuator device 700 may include a base 710, a frame 720, an optical element 730, and a controller 750 (shown in FIGS. 1A to 1C). The frame 720 may be disposed in the base 710 and the optical element 730 may be disposed in the frame 720. Specifically, the frame 720 may include a moving frame 721 and a moving frame 722. The moving frame 721 may be disposed in the base 710 and may be connected to the base 710 through a rotating shaft 723. The moving frame 722 may be disposed in the moving frame 721 and may be connected to the moving frame 721 through a rotating shaft 724. The optical element 730 may be disposed in the moving frame 722.

The actuator device 700 may further include at least one driving assembly disposed between the base 710, the moving frame 721, and the moving frame 722. The at least one driving assembly is, for example, a voice coil motor or a piezoelectric material. Specifically, the at least one driving assembly may include one or more driving assembly 741. The driving assembly 741 may be disposed between the base 710 and the moving frame 721. The controller 750 may be coupled to the driving assembly 741, and may be configured to control the driving assembly 741 to drive the moving frame 721 through the first signal, so that the optical element 730 swings reciprocally relative to the base 710 based on an actuating shaft 70 (that is, the actuating shaft 70 serves as a rotating shaft). In the embodiment, it is assumed that the actuating shaft 70 is parallel to the X-axis direction. A number of the driving assembly 741 is, for example, 1, 2, or N (N is any positive integer). When the number of the driving assembly 741 is two, the two driving assemblies 741 may be respectively disposed on two opposite sides of the moving frame 721. In an embodiment, the driving assembly 741 may be disposed on an actuating shaft 80.

On the other hand, the at least one driving assembly may include one or more driving assembly 742. The driving assembly 742 may be disposed between the moving frame 721 and the moving frame 722. The controller 750 may be coupled to the driving assembly 742, and may be configured to control the driving assembly 742 to drive the moving frame 722 through the second signal, so that the optical element 730 swings reciprocally relative to the base 710 based on the actuating shaft 80 (that is, the actuating shaft 80 serves as a rotating shaft). In the embodiment, it is assumed that the actuating shaft 80 is parallel to the Y-axis direction. In other words, the actuating shaft 70 and the actuating shaft 80 may be perpendicular to each other. A number of driving assembly 742 is, for example, 1, 2, or N (N is any positive integer). When the number of the driving assembly 742 is two, the two driving assemblies 742 may be respectively disposed on two opposite sides of the moving frame 722. In an embodiment, the driving assembly 742 may be disposed on the actuating shaft 70.

Figure 8A:
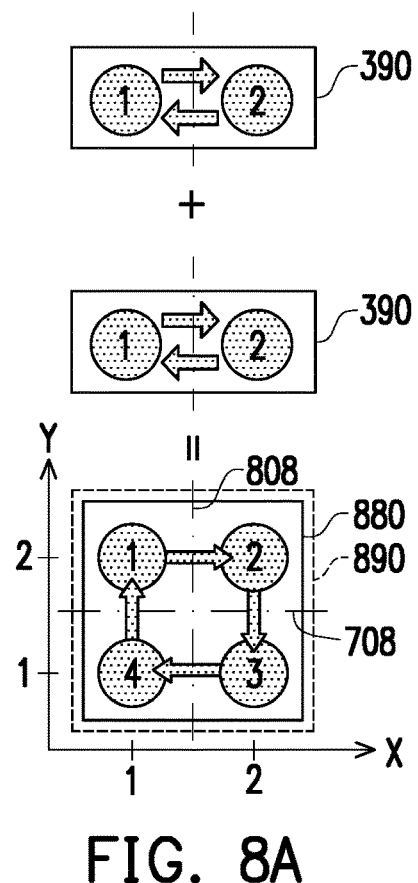
FIG. 8A is a schematic diagram of a pixel generated using the actuator device in FIG. 7 according to a comparative example of the related art.
Figure 8B:
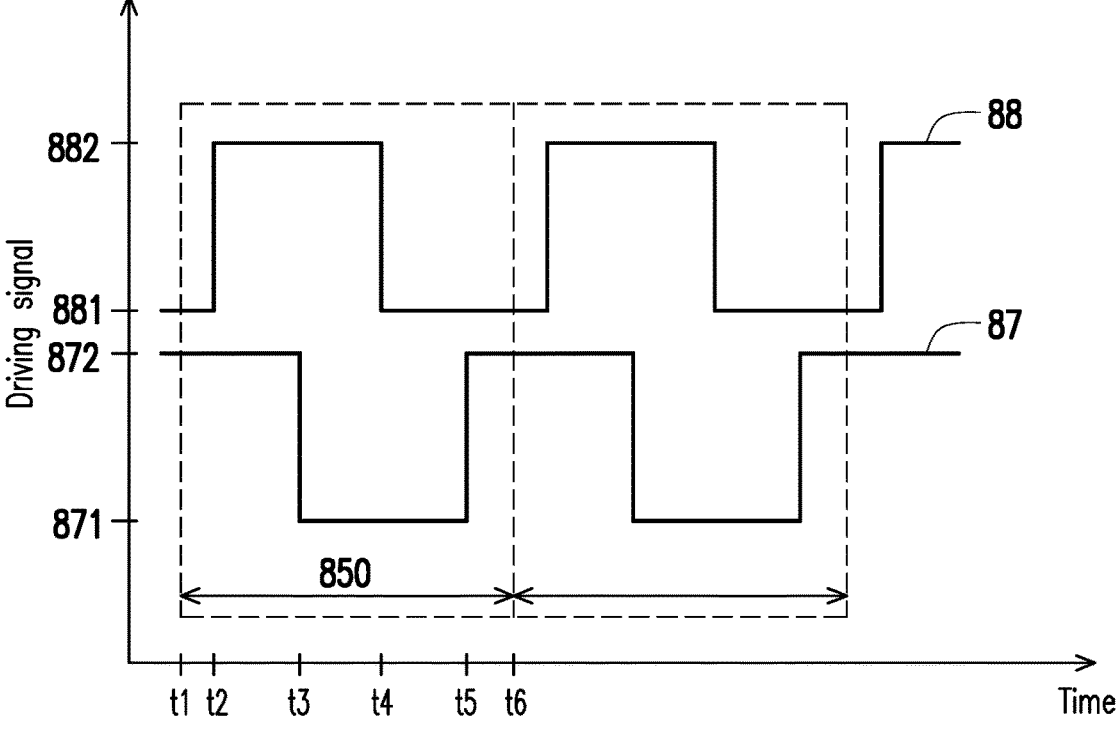
FIG. 8B is a schematic diagram of a signal generated by the controller using the actuator device in FIG. 7 according to a comparative example of the related art.

FIG. 8A is a schematic diagram of a pixel 880 generated using the actuator device 700 of FIG. 7 according to a comparative example of the related art. FIG. 8B is a schematic diagram of a signal 87 and a signal 88 generated by the controller 750 using the actuator device 700 in FIG. 7 according to a comparative example of the related art, where the signal 87 or the signal 88 may be a digital signal or an analog signal. With reference to FIGS. 7, 8A and 8B, the controller (not shown in the figure) may be configured to control the driving assembly 741 through the signal 87, so that the optical element 730 swings reciprocally relative to the base 710 based on the actuating shaft 70. On the other hand, the controller may be configured to control the driving assembly 742 through the signal 88, so that the optical element 730 swings reciprocally relative to the base 710 based on the actuating shaft 80. When the optical element 730 swings reciprocally relative to the base 710 based on the actuating shaft 70 and the actuating shaft 80, the image beam passing through the optical element 730 may be transmitted to a virtual plane 890 to form a moving light spot on the virtual plane 890. A movement trajectory of the light spot on the virtual plane 890 is like superimposing two movement trajectories that are the same as a movement trajectory of the light spot on the virtual plane 390. The image beam passing through the optical element 730 forms the light spot on the virtual plane 890 that moves in an order of a position 1, a position 2, a position 3, and a position 4, thereby forming the pixel 880 through the moving light spot.

Specifically, frequencies of the signal 87 and the signal 88 may be the same, and a phase difference between the signal 87 and the signal 88 may not be zero. For example, the phase difference between the signal 87 and the signal 88 may be 90 degrees. The signal 87 may include a driving signal 871 corresponding to a first swing angle of the actuating shaft 70 and a driving signal 872 corresponding to a second swing angle of the actuating shaft 70. The driving signal 871 and the driving signal 872 may respectively correspond to different driving currents (that is, different current intensities) or different driving voltages (that is, different voltage levels). When the controller sends the driving signal 871 to the driving assembly 741, the driving assembly 741 may drive the moving frame 721, so that the optical element 730 swings based on the first swing angle of the actuating shaft 70. When the optical element 730 swings based on the first swing angle of the actuating shaft 70, the light spot formed on the virtual plane 890 by the image beam passing through the optical element 730 may move in a radial direction of an axis 708 to a position that corresponds to "Y=1". The axis 708 may be an axis corresponding to the actuating shaft 70 on the virtual plane 890. On the other hand, when the controller sends the driving signal 872 to the driving assembly 741, the driving assembly 741 may drive the moving frame 721, so that the optical element 730 swings based on the second swing angle of the actuating shaft 70. When the optical element 730 swings based on the second swing angle of the actuating shaft 70, the light spot formed on the virtual plane 890 by the image beam passing through the optical element 730 may move in the radial direction of the axis 708 to a position that corresponds to "Y=2".

The signal 88 may include a driving signal 881 corresponding to a third swing angle of the actuating shaft 80 and a driving signal 882 corresponding to a fourth swing angle of the actuating shaft 80. The third swing angle of the actuating shaft 80 may be the same as the first swing angle of the actuating shaft 70, and the fourth swing angle of the actuating shaft 80 may be the same as the second swing angle of the actuating shaft 70. The driving signal 881 and the driving signal 882 may respectively correspond to different driving currents (that is, different current intensities) or different driving voltages (that is, different voltage levels). When the controller sends the driving signal 881 to the driving assembly 742, the driving assembly 742 may drive the moving frame 722, so that the optical element 730 swings based on the third swing angle of the actuating shaft 80. When the optical element 730 swings based on the third swing angle of the actuating shaft 80, the light spot formed on the virtual plane 890 by the image beam passing through the optical element 730 may move in a radial direction of an axis 808 to a position that corresponds to "X=1". The axis 808 may be an axis corresponding to the actuating shaft 80 on the virtual plane 890. On the other hand, when the controller sends the driving signal 882 to the driving assembly 742, the driving assembly 742 may drive the moving frame 722, so that the optical element 730 swings based on the fourth swing angle of the actuating shaft 80. When the optical element 730 swings based on the fourth swing angle of the actuating shaft 80, the light spot formed on the virtual plane 890 by the image beam passing through the optical element 730 may move in the radial direction of the axis 808 to a position that corresponds to "X=2".

Based on the above, when the optical element 730 swings based on the second swing angle of the actuating shaft 70 and the third swing angle of the actuating shaft 80, the light spot formed on the virtual plane 890 by the image beam passing through the optical element 730 may move to a position 1 representing "X=1, Y=2". When the optical element 730 swings based on the second swing angle of the actuating shaft 70 and the fourth swing angle of the actuating shaft 80, the light spot formed on the virtual plane 890 by the image beam passing through the optical element 730 may move to a position 2 representing "X=2, Y=2". When the optical element 730 swings based on the first swing angle of the actuating shaft 70 and the fourth swing angle of the actuating shaft 80, the light spot formed on the virtual plane 890 by the image beam passing through the optical element 730 may move to a position 3 representing "X=2, Y=1". When the optical element 730 swings based on the first swing angle of the actuating shaft 70 and the third swing angle of the actuating shaft 80, the light spot formed on the virtual plane 890 by the image beam passing through the optical element 730 may move to a position 4 representing "X=1, Y=1".

A time interval 850 may be a period for generating the pixel 880. Taking the time interval 850 as an example, at a time point t1, the controller may drive the moving frame 721 through the driving signal 872 and may drive the moving frame 722 through the driving signal 881, so that the optical element 730 maintains swinging based on the second swing angle of the actuating shaft 70 and the third swing angle of the actuating shaft 80. Therefore, the light spot formed on the virtual plane 890 by the image beam passing through the optical element 730 may remain in the position 1.

At a time point t2, the controller may drive the moving frame 721 through the driving signal 872 and may drive the moving frame 722 through the driving signal 882, so that the optical element 730 swings based on the second swing angle of the actuating shaft 70 and the fourth swing angle of the actuating shaft 80. Therefore, the light spot formed on the virtual plane 890 by the image beam passing through the optical element 730 may move and remain in the position 2.

At a time point t3, the controller may drive the moving frame 721 through the driving signal 871 and may drive the moving frame 722 through the driving signal 882, so that the optical element 730 swings based on the first swing angle of the actuating shaft 70 and the fourth swing angle of the actuating shaft 80. Therefore, the light spot formed on the virtual plane 890 by the image beam passing through the optical element 730 may move and remain in the position 3.

At a time point t4, the controller may drive the moving frame 721 through the driving signal 871 and may drive the moving frame 722 through the driving signal 881, so that the optical element 730 swings based on the first swing angle of the actuating shaft 70 and the third swing angle of the actuating shaft 80. Therefore, the light spot formed on the virtual plane 890 by the image beam passing through the optical element 730 may move and remain in the position 4.

At a time point t5, the controller may drive the moving frame 721 through the driving signal 872 and may drive the moving frame 722 through the driving signal 881, so that the optical element 730 swings based on the second swing angle of the actuating shaft 70 and the third swing angle of the actuating shaft 80. Therefore, the light spot formed on the virtual plane 890 by the image beam passing through the optical element 730 may move and remain in the position 1.

At a time point t6, the controller may drive the moving frame 721 through the driving signal 872 and may drive the moving frame 722 through the driving signal 881, so that the optical element 730 maintains swinging based on the second swing angle of the actuating shaft 70 and the third swing angle of the actuating shaft 80. Therefore, the light spot formed on the virtual plane 890 by the image beam passing through the optical element 730 may remain in the position 1.

From the comparative example of FIGS. 8A and 8B, it can be seen that the controller controls the driving assembly 741 to drive the moving frame 721 through the signal 87 and controls the driving assembly 742 to drive the moving frame 722 through the signal 88, so that the optical element 730 swings reciprocally relative to the base 710 based on the only two swing angles of the actuating shaft 70 and the only two swing angles of the actuating shaft 80. This enables the light spot formed by the image beam on the virtual plane 890 to move among up to four positions, thereby increasing the resolution of the image beam. However, the resolution that can be increased by the above-mentioned related art solution is limited. When a number of the swing angles of each of the actuating shafts of the dual-shaft actuator device is increased, that is, increasing the positions in which each of the actuating shafts of the dual-shaft actuator device may remain in, the resolution of the image beam of the projection device is further improved.

Figures 9A, 9B:
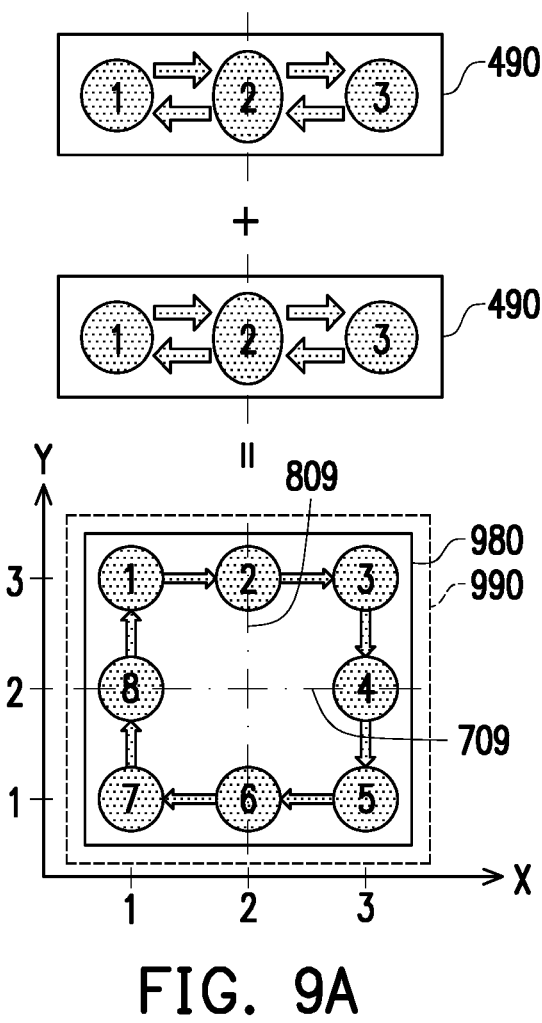
FIG. 9A is a schematic diagram of a pixel generated using the actuator device in FIG. 7 according to another embodiment of the disclosure.
FIG. 9B is a schematic diagram of a signal generated by the controller using the actuator device in FIG. 7 according to another embodiment of the disclosure.

FIG. 9A is a schematic diagram of a pixel 980 generated using the actuator device 700 in FIG. 7 according to another embodiment of the disclosure. FIG. 9B is a schematic diagram of a signal 97 and a signal 98 generated by the controller 750 using the actuator device 700 in FIG. 7 according to another embodiment of the disclosure, where the signal 97 or the signal 98 may be a digital signal or an analog signal. With reference to FIGS. 1A to 1C, FIG. 7, and FIGS. 9A and 9B, the controller 750 (shown in FIGS. 1A to 1C) may be configured to control the driving assembly 741 through the signal 97 (for example, the first signal), so that the optical element 730 swings reciprocally relative to the base 710 based on an order of the first swing angle, the second swing angle, and a third swing angle of the actuating shaft 70 (for example, the first actuating shaft). On the other hand, the controller 750 may be configured to control the driving assembly 742 through the signal 98 (for example, the second signal), so that the optical element 730 swings reciprocally relative to the base 710 based on an order of the fourth swing angle, a fifth swing angle, and a sixth swing angle of the actuating shaft 80 (for example, the second actuating shaft). When the optical element 730 swings reciprocally relative to the base 710 based on the actuating shaft 70 and the actuating shaft 80, the image beam passing through the optical element 730 may be transmitted to a virtual plane 990 to form a moving light spot on the virtual plane 990. A movement trajectory of the light spot on the virtual plane 990 is like superimposing two movement trajectories that are the same as a movement trajectory of the light spot on the virtual plane 490. The image beam passing through the optical element 730 forms a light spot on the virtual plane 990 that moves in an order of position 1 to position 8, thereby forming the pixel 980 through the moving light spot.

Specifically, frequencies of the signal 97 and the signal 98 may be the same, and a phase difference between the signal 97 and the signal 98 may not be zero. For example, the phase difference between the signal 97 and the signal 98 may be 90 degrees. The signal 97 may include a driving signal 971 corresponding to the first swing angle of the actuating shaft 70, a driving signal 972 corresponding to the second swing angle of the actuating shaft 70, and a driving signal 973 corresponding to the third swing angle of the actuating shaft 70. The driving signal 971, the driving signal 972, and the driving signal 973 may respectively correspond to different driving currents (that is, different current intensities) or different driving voltages (that is, different voltage levels). When the controller 750 sends the driving signal 971 to the driving assembly 741, the driving assembly 741 may drive the moving frame 721, so that the optical element 730 swings based on the first swing angle of the actuating shaft 70. When the optical element 730 swings based on the first swing angle of the actuating shaft 70, the light spot formed on the virtual plane 990 by the image beam passing through the optical element 730 may move in a radial direction of an axis 709 to a position corresponding to "Y=1". The axis 709 may be an axis corresponding to the actuating shaft 70 on the virtual plane 990. In addition, when the controller 750 sends the driving signal 972 to the driving assembly 741, the driving assembly 741 may drive the moving frame 721, so that the optical element 730 swings based on the second swing angle of the actuating shaft 70. When the optical element 730 swings based on the second swing angle of the actuating shaft 70, the light spot formed on the virtual plane 990 by the image beam passing through the optical element 730 may move in the radial direction of the axis 709 to a position corresponding to "Y=2". Furthermore, when the controller 750 sends the driving signal 973 to the driving assembly 741, the driving assembly 741 may drive the moving frame 721, so that the optical element 730 swings based on the third swing angle of the actuating shaft 70. When the optical element 730 swings based on the third swing angle of the actuating shaft 70, the light spot formed on the virtual plane 990 by the image beam passing through the optical element 730 may move in the radial direction of the axis 709 to a position corresponding to "Y=3".

The signal 98 may include a driving signal 981 corresponding to the fourth swing angle of the actuating shaft 80, a driving signal 982 corresponding to the fifth swing angle of the actuating shaft 80, and a driving signal 983 corresponding to the sixth swing angle of the actuating shaft 80. The fourth swing angle of the actuating shaft 80 may be the same as the first swing angle of the actuating shaft 70, the fifth swing angle of the actuating shaft 80 may be the same as the second swing angle of the actuating shaft 70, and the sixth swing angle of the actuating shaft 80 may be the same as the third swing angle of the actuating shaft 70. The driving signal 981, the driving signal 982, and the driving signal 983 may respectively correspond to different driving currents (that is, different current intensities) or different driving voltages (that is, different voltage levels). When the controller 750 sends the driving signal 981 to the driving assembly 742, the driving assembly 742 may drive the moving frame 722, so that the optical element 730 swings based on the fourth swing angle of the actuating shaft 80. When the optical element 730 swings based on the fourth swing angle of the actuating shaft 80, the light spot formed on the virtual plane 990 by the image beam passing through the optical element 730 may move in a radial direction of an axis 809 to a position corresponding to "X=1". The axis 809 may be an axis corresponding to the actuating shaft 80 on the virtual plane 990. In addition, when the controller 750 sends the driving signal 982 to the driving assembly 742, the driving assembly 742 may drive the moving frame 722, so that the optical element 730 swings based on the fifth swing angle of the actuating shaft 80. When the optical element 730 swings based on the fifth swing angle of the actuating shaft 80, the light spot formed on the virtual plane 990 by the image beam passing through the optical element 730 may move in the radial direction of the axis 809 to a position corresponding to "X=2". Furthermore, when the controller 750 sends the driving signal 983 to the driving assembly 742, the driving assembly 742 may drive the moving frame 722, so that the optical element 730 swings based on the sixth swing angle of the actuating shaft 80. When the optical element 730 swings based on the sixth swing angle of the actuating shaft 80, the light spot formed on the virtual plane 990 by the image beam passing through the optical element 730 may move in the radial direction of the axis 809 to a position corresponding to "X=3".

Based on the above, when the optical element 730 swings based on the third swing angle of the actuating shaft 70 and the fourth swing angle of the actuating shaft 80, the light spot formed on the virtual plane 990 by the image beam passing through the optical element 730 may move to the position 1 representing "X=1, Y=3". When the optical element 730 swings based on the third swing angle of the actuating shaft 70 and the fifth swing angle of the actuating shaft 80, the light spot formed on the virtual plane 990 by the image beam passing through the optical element 730 may move to the position 2 representing "X=2, Y=3". When the optical element 730 swings based on the third swing angle of the actuating shaft 70 and the sixth swing angle of the actuating shaft 80, the light spot formed on the virtual plane 990 by the image beam passing through the optical element 730 may move to the position 3 representing "X=3, Y=3". When the optical element 730 swings based on the second swing angle of the actuating shaft 70 and the sixth swing angle of the actuating shaft 80, the light spot formed on the virtual plane 990 by the image beam passing through the optical element 730 may move to the position 4 representing "X=3, Y=2". When the optical element 730 swings based on the first swing angle of the actuating shaft 70 and the sixth swing angle of the actuating shaft 80, the light spot formed on the virtual plane 990 by the image beam passing through the optical element 730 may move to the position 5 representing "X=3, Y=1". When the optical element 730 swings based on the first swing angle of the actuating shaft 70 and the fifth swing angle of the actuating shaft 80, the light spot formed on the virtual plane 990 by the image beam passing through the optical element 730 may move to the position 6 representing "X=2, Y=1". When the optical element 730 swings based on the first swing angle of the actuating shaft 70 and the fourth swing angle of the actuating shaft 80, the light spot formed on the virtual plane 990 by the image beam passing through the optical element 730 may move to the position 7 representing "X=1, Y=1". When the optical element 730 swings based on the second swing angle of the actuating shaft 70 and the fourth swing angle of the actuating shaft 80, the light spot formed on the virtual plane 990 by the image beam passing through the optical element 730 may move to the position 8 representing "X=1, Y=2".

In an embodiment, the swing angle based on the actuating shaft 70 may be proportional to the driving current (or the driving voltage) of the driving signal. For example, it is assumed that the third swing angle is greater than the second swing angle, and the second swing angle is greater than the first swing angle. In other words, the second swing angle is between the first swing angle and the third swing angle. Accordingly, a driving current (or a driving voltage) of the driving signal 973 may be greater than a driving current (or a driving voltage) of the driving signal 972, and the driving current (or the driving voltage) of the driving signal 972 may be greater than a driving current (or a driving voltage) of the driving signal 971. On the other hand, the swing angle based on the actuating shaft 80 may be proportional to the driving current (or the driving voltage) of the driving signal. For example, it is assumed that the sixth swing angle is greater than the fifth swing angle, and the fifth swing angle is greater than the fourth swing angle. In other words, the fifth swing angle is between the fourth swing angle and the sixth swing angle. Accordingly, a driving current (or a driving voltage) of the driving signal 983 may be greater than a driving current (or a driving voltage) of the driving signal 982, and the driving current (or the driving voltage) of the driving signal 982 may be greater than a driving current (or a driving voltage) of the driving signal 981.

A time interval 950 may be a period for generating the pixel 980. Taking the time interval 950 as an example, at a time point t1, the controller 750 may drive the moving frame 721 through the driving signal 973 and may drive the moving frame 722 through the driving signal 981, so that the optical element 730 swings based on the third swing angle of the actuating shaft 70 and the fourth swing angle of the actuating shaft 80. Therefore, the light spot formed on the virtual plane 990 by the image beam passing through the optical element 730 may move and remain in the position 1.

At a time point t2, the controller 750 may drive the moving frame 721 through the driving signal 973 and may drive the moving frame 722 through the driving signal 982, so that the optical element 730 swings based on the third swing angle of the actuating shaft 70 and the fifth swing angle of the actuating shaft 80. Therefore, the light spot formed on the virtual plane 990 by the image beam passing through the optical element 730 may move and remain in the position 2.

At a time point t3, the controller 750 may drive the moving frame 721 through the driving signal 973 and may drive the moving frame 722 through the driving signal 983, so that the optical element 730 swings based on the third swing angle of the actuating shaft 70 and the sixth swing angle of the actuating shaft 80. Therefore, the light spot formed on the virtual plane 990 by the image beam passing through the optical element 730 may move and remain in the position 3.

At a time point t4, the controller 750 may drive the moving frame 721 through the driving signal 972 and may drive the moving frame 722 through the driving signal 983, so that the optical element 730 swings based on the second swing angle of the actuating shaft 70 and the sixth swing angle of the actuating shaft 80. Therefore, the light spot formed on the virtual plane 990 by the image beam passing through the optical element 730 may move and remain in the position 4.

At a time point t5, the controller 750 may drive the moving frame 721 through the driving signal 971 and may drive the moving frame 722 through the driving signal 983, so that the optical element 730 swings based on the first swing angle of the actuating shaft 70 and the sixth swing angle of the actuating shaft 80. Therefore, the light spot formed on the virtual plane 990 by the image beam passing through the optical element 730 may move and remain in the position 5.

At a time point t6, the controller 750 may drive the moving frame 721 through the driving signal 971 and may drive the moving frame 722 through the driving signal 982, so that the optical element 730 swings based on the first swing angle of the actuating shaft 70 and the fifth swing angle of the actuating shaft 80. Therefore, the light spot formed on the virtual plane 990 by the image beam passing through the optical element 730 may move and remain in the position 6.

At a time point t7, the controller 750 may drive the moving frame 721 through the driving signal 971 and may drive the moving frame 722 through the driving signal 981, so that the optical element 730 swings based on the first swing angle of the actuating shaft 70 and the fourth swing angle of the actuating shaft 80. Therefore, the light spot formed on the virtual plane 990 by the image beam passing through the optical element 730 may move and remain in the position 7.

At a time point t8, the controller 750 may drive the moving frame 721 through the driving signal 972 and may drive the moving frame 722 through the driving signal 981, so that the optical element 730 swings based on the second swing angle of the actuating shaft 70 and the fourth swing angle of the actuating shaft 80. Therefore, the light spot formed on the virtual plane 990 by the image beam passing through the optical element 730 may move and remain in the position 8.

At a time point t9, the controller 750 may drive the moving frame 721 through the driving signal 973 and may drive the moving frame 722 through the driving signal 981, so that the optical element 730 swings based on the third swing angle of the actuating shaft 70 and the fourth swing angle of the actuating shaft 80. Therefore, the light spot formed on the virtual plane 990 by the image beam passing through the optical element 730 may move and remain in the position 1.

Figures 10A, 10B:
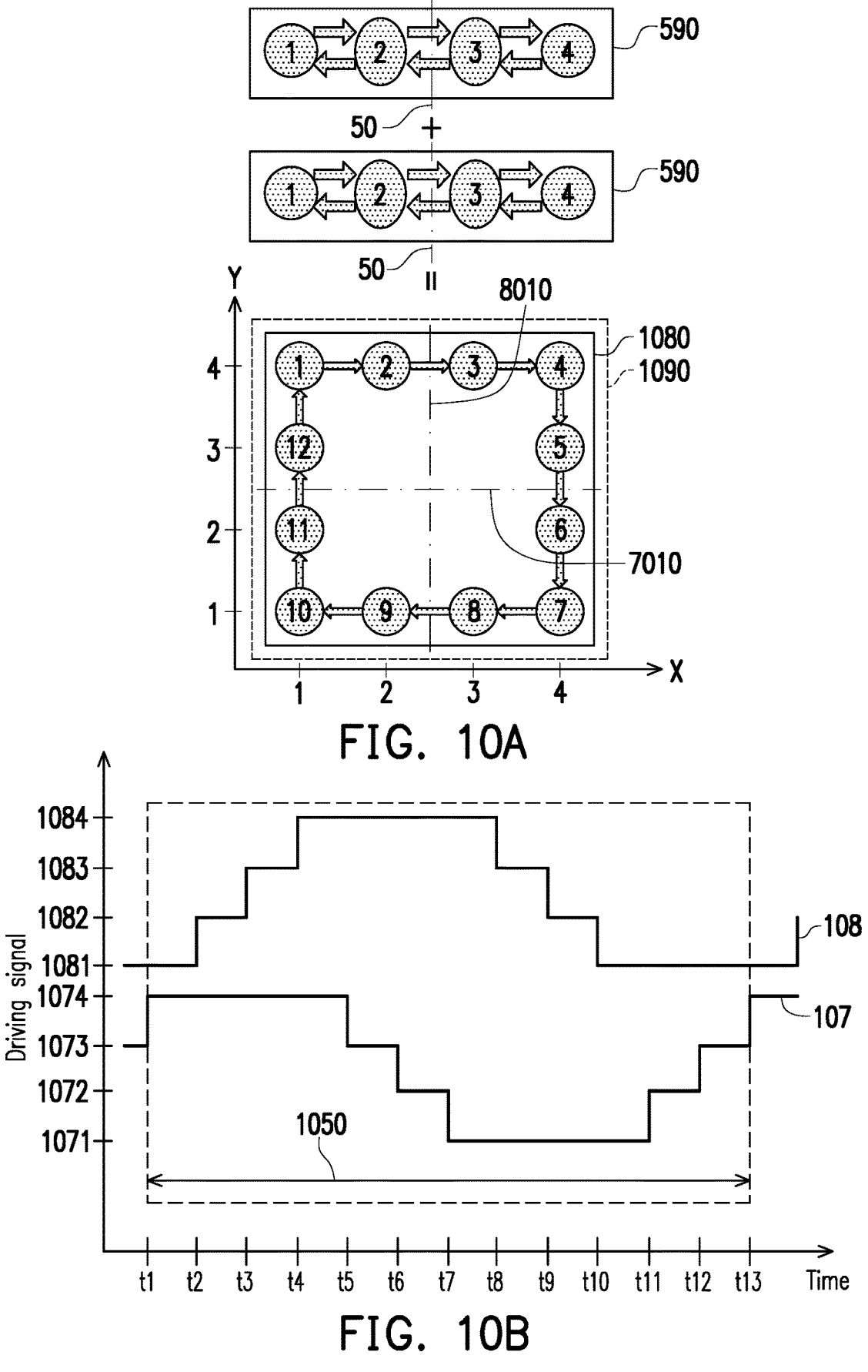
FIG. 10A is a schematic diagram of a pixel generated using the actuator device in FIG. 7 according to another embodiment of the disclosure.
FIG. 10B is a schematic diagram of a signal generated by the controller using the actuator device in FIG. 7 according to another embodiment of the disclosure.

FIG. 10A is a schematic diagram of a pixel 1080 generated using the actuator device 700 in FIG. 7 according to another embodiment of the disclosure. FIG. 10B is a schematic diagram of a signal 107 and a signal 108 generated by the controller 750 using the actuator device 700 in FIG. 7 according to another embodiment of the disclosure, where the signal 107 or the signal 108 may be a digital signal or an analog signal. With reference to FIGS. 1A to 1C, FIG. 7, and FIGS. 10A and 10B, the controller 750 (shown in FIGS. 1A to 1C) may be configured to control the driving assembly 741 through the signal 107 (for example, the first signal) so that the optical element 730 swings reciprocally relative to the base 710 based on an order of the first swing angle, the second swing angle, the third swing angle, and a fourth swing angle of the actuating shaft 70 (for example, the first actuating shaft). On the other hand, the controller 750 may be configured to control the driving assembly 742 through the signal 108 (for example, the second signal) so that the optical element 730 swings reciprocally relative to the base 710 based on an order of the fifth swing angle, the sixth swing angle, a seventh swing angle, and an eighth swing angle of the actuating shaft 80 (for example, the second actuating shaft). When the optical element 730 swings based on the above-mentioned order, the image beam passing through the optical element 730 may be transmitted to a virtual plane 1090 to form a moving light spot on the virtual plane 1090. A movement trajectory of the light spot on the virtual plane 1090 is like superimposing two movement trajectories that are the same as the movement trajectory of the light spot on the virtual plane 590. The image beam passing through the optical element 730 forms a light spot on the virtual plane 1090 that moves in an order of position 1 to position 12, thereby forming the pixel 1080 through the moving light spot.

Specifically, frequencies of the signal 107 and the signal 108 may be the same, and a phase difference between the signal 107 and the signal 108 may not be zero. For example, the phase difference between the signal 107 and the signal 108 may be 90 degrees. The signal 107 may include a driving signal 1071 corresponding to the first swing angle of the actuating shaft 70, a driving signal 1072 corresponding to the second swing angle of the actuating shaft 70, and a driving signal 1073 corresponding to the third swing angle of the actuating shaft 70, and a driving signal 1074 corresponding to the fourth swing angle of the actuating shaft 70. The driving signal 1071, the driving signal 1072, the driving signal 1073, and the driving signal 1074 may respectively correspond to different driving currents (that is, different current intensities) or different driving voltages (that is, different voltage levels). When the controller 750 sends the driving signal 1071 to the driving assembly 741, the driving assembly 741 may drive the moving frame 721, so that the optical element 730 swings based on the first swing angle of the actuating shaft 70. When the optical element 730 swings based on the first swing angle of the actuating shaft 70, the light spot formed on the virtual plane 1090 by the image beam passing through the optical element 730 may move in a radial direction of an axis 7010 to a position corresponding to "Y=1". The axis 7010 may be an axis corresponding to the actuating shaft 70 on the virtual plane 1090. When the controller 750 sends the driving signal 1072 to the driving assembly 741, the driving assembly 741 may drive the moving frame 721, so that the optical element 730 swings based on the second swing angle of the actuating shaft 70. When the optical element 730 swings based on the second swing angle of the actuating shaft 70, the light spot formed on the virtual plane 1090 by the image beam passing through the optical element 730 may move in the radial direction of the axis 7010 to a position corresponding to "Y=2". When the controller 750 sends the driving signal 1073 to the driving assembly 741, the driving assembly 741 may drive the moving frame 721, so that the optical element 730 swings based on the third swing angle of the actuating shaft 70. When the optical element 730 swings based on the third swing angle of the actuating shaft 70, the light spot formed on the virtual plane 1090 by the image beam passing through the optical element 730 may move in the radial direction of the axis 7010 to a position corresponding to "Y=3". When the controller 750 sends the driving signal 1074 to the driving assembly 741, the driving assembly 741 may drive the moving frame 721, so that the optical element 730 swings based on the fourth swing angle of the actuating shaft 70. When the optical element 730 swings based on the fourth swing angle of the actuating shaft 70, the light spot formed on the virtual plane 1090 by the image beam passing through the optical element 730 may move in the radial direction of the axis 7010 to a position corresponding to "Y=4".

The signal 108 may include a driving signal 1081 corresponding to the fifth swing angle of the actuating shaft 80, a driving signal 1082 corresponding to the sixth swing angle of the actuating shaft 80, and a driving signal 1083 corresponding to the seventh swing angle of the actuating shaft 80, and a driving signal 1084 corresponding to the eighth swing angle of the actuating shaft 80. The fifth swing angle of the actuating shaft 80 may be the same as the first swing angle of the actuating shaft 70, the sixth swing angle of the actuating shaft 80 may be the same as the second swing angle of the actuating shaft 70, the seventh swing angle of the actuating shaft 80 may be the same as the third swing angle of the actuating shaft 70, and the eighth swing angle of the actuating shaft 80 may be the same as the fourth swing angle of the actuating shaft 70. The driving signal 1081, the driving signal 1082, the driving signal 1083, and the driving signal 1084 may respectively correspond to different currents (that is, different current intensities) or different driving voltages (that is, different voltage levels). When the controller 750 sends the driving signal 1081 to the driving assembly 742, the driving assembly 742 may drive the moving frame 722, so that the optical element 730 swings based on the fifth swing angle of the actuating shaft 80. When the optical element 730 swings based on the fifth swing angle of the actuating shaft 80, the light spot formed on the virtual plane 1090 by the image beam passing through the optical element 730 may move in a radial direction of an axis 8010 to a position corresponding to "X=1". The axis 8010 may be an axis corresponding to the actuating shaft 80 on the virtual plane 1090. When the controller 750 sends the driving signal 1082 to the driving assembly 742, the driving assembly 742 may drive the moving frame 722, so that the optical element 730 swings based on the sixth swing angle of the actuating shaft 80. When the optical element 730 swings based on the sixth swing angle of the actuating shaft 80, the light spot formed on the virtual plane 1090 by the image beam passing through the optical element 730 may move in the radial direction of the axis 8010 to a position corresponding to "X=2". When the controller 750 sends the driving signal 1083 to the driving assembly 742, the driving assembly 742 may drive the moving frame 722, so that the optical element 730 swings based on the seventh swing angle of the actuating shaft 80. When the optical element 730 swings based on the seventh swing angle of the actuating shaft 80, the light spot formed on the virtual plane 1090 by the image beam passing through the optical element 730 may move in the radial direction of the axis 8010 to a position corresponding to "X=3". When the controller 750 sends the driving signal 1084 to the driving assembly 742, the driving assembly 742 may drive the moving frame 722, so that the optical element 730 swings based on the eighth swing angle of the actuating shaft 80. When the optical element 730 swings based on the eighth swing angle of the actuating shaft 80, the light spot formed on the virtual plane 1090 by the image beam passing through the optical element 730 may move in the radial direction of the axis 8010 to a position corresponding to "X=4".

Based on the above, when the optical element 730 swings based on the fourth swing angle of the actuating shaft 70 and the fifth swing angle of the actuating shaft 80, the light spot formed on the virtual plane 1090 by the image beam passing through the optical element 730 may move to the position 1 representing "X=1, Y=4". When the optical element 730 swings based on the fourth swing angle of the actuating shaft 70 and the sixth swing angle of the actuating shaft 80, the light spot formed on the virtual plane 1090 by the image beam passing through the optical element 730 may move to the position 2 representing "X=2, Y=4". When the optical element 730 swings based on the fourth swing angle of the actuating shaft 70 and the seventh swing angle of the actuating shaft 80, the light spot formed on the virtual plane 1090 by the image beam passing through the optical element 730 may move to the position 3 representing "X=3, Y=4". When the optical element 730 swings based on the fourth swing angle of the actuating shaft 70 and the eighth swing angle of the actuating shaft 80, the light spot formed on the virtual plane 1090 by the image beam passing through the optical element 730 may move to the position 4 representing "X=4, Y=4". When the optical element 730 swings based on the third swing angle of the actuating shaft 70 and the eighth swing angle of the actuating shaft 80, the light spot formed on the virtual plane 1090 by the image beam passing through the optical element 730 may move to the position 5 representing "X=4, Y=3". When the optical element 730 swings based on the second swing angle of the actuating shaft 70 and the eighth swing angle of the actuating shaft 80, the light spot formed on the virtual plane 1090 by the image beam passing through the optical element 730 may move to the position 6 representing "X=4, Y=2". When the optical element 730 swings based on the first swing angle of the actuating shaft 70 and the eighth swing angle of the actuating shaft 80, the light spot formed on the virtual plane 1090 by the image beam passing through the optical element 730 may move to the position 7 representing "X=4, Y=1". When the optical element 730 swings based on the first swing angle of the actuating shaft 70 and the seventh swing angle of the actuating shaft 80, the light spot formed on the virtual plane 1090 by the image beam passing through the optical element 730 may move to the position 8 representing "X=3, Y=1". When the optical element 730 swings based on the first swing angle of the actuating shaft 70 and the sixth swing angle of the actuating shaft 80, the light spot formed on the virtual plane 1090 by the image beam passing through the optical element 730 may move to the position 9 representing "X=2, Y=1". When the optical element 730 swings based on the first swing angle of the actuating shaft 70 and the fifth swing angle of the actuating shaft 80, the light spot formed on the virtual plane 1090 by the image beam passing through the optical element 730 may move to the position 10 representing "X=1, Y=1". When the optical element 730 swings based on the second swing angle of the actuating shaft 70 and the fifth swing angle of the actuating shaft 80, the light spot formed on the virtual plane 1090 by the image beam passing through the optical element 730 may move to the position 11 representing "X=1, Y=2". When the optical element 730 swings based on the third swing angle of the actuating shaft 70 and the fifth swing angle of the actuating shaft 80, the light spot formed on the virtual plane 1090 by the image beam passing through the optical element 730 may move to the position 12 representing "X=1, Y=3".

In an embodiment, the swing angle based on the actuating shaft 70 may be proportional to the driving current (or the driving voltage) of the driving signal. For example, it is assumed that the fourth swing angle is greater than the third swing angle, the third swing angle is greater than the second swing angle, and the second swing angle is greater than the first swing angle. In other words, the second swing angle is between the first swing angle and the third swing angle, and the third swing angle is between the second swing angle and the fourth swing angle. Accordingly, a driving current (or a driving voltage) of the driving signal 1074 may be greater than a driving current (or a driving voltage) of the driving signal 1073, the driving current (or the driving voltage) of the driving signal 1073 may be greater than a driving current (or a driving voltage) of the driving signal 1072, and the driving current (or the driving voltage) of the driving signal 1072 may be greater than a driving current (or a driving voltage) of the driving signal 1071. On the other hand, the swing angle based on the actuating shaft 80 may be proportional to the driving current (or the driving voltage) of the driving signal. For example, suppose that the eighth swing angle is greater than the seventh swing angle, the seventh swing angle is greater than the sixth swing angle, and the sixth swing angle is greater than the fifth swing angle. In other words, the sixth swing angle is between the fifth swing angle and the seventh swing angle, and the seventh swing angle is between the sixth swing angle and the eighth swing angle. Accordingly, a driving current (or a driving voltage) of the driving signal 1084 may be greater than a driving current (or a driving voltage) of the driving signal 1083, the driving current (or the driving voltage) of the driving signal 1083 may be greater than a driving current (or a driving voltage) of the driving signal 1082, and the driving current (or the driving voltage) of the driving signal 1082 may be greater than a driving current (or a driving voltage) of the driving signal 1081.

A time interval 1050 may be a period for generating the pixel 1080. Taking the time interval 1050 as an example, at a time point t1, the controller 750 may drive the moving frame 721 through the driving signal 1074 and may drive the moving frame 722 through the driving signal 1081, so that the optical element 730 swings based on the fourth swing angle of the actuating shaft 70 and the fifth swing angle of the actuating shaft 80. Therefore, the light spot formed on the virtual plane 1090 by the image beam passing through the optical element 730 may move and remain in the position 1.

At a time point t2, the controller 750 may drive the moving frame 721 through the driving signal 1074 and may drive the moving frame 722 through the driving signal 1082, so that the optical element 730 swings based on the fourth swing angle of the actuating shaft 70 and the sixth swing angle of the actuating shaft 80. Therefore, the light spot formed on the virtual plane 1090 by the image beam passing through the optical element 730 may move and remain in the position 2.

At a time point t3, the controller 750 may drive the moving frame 721 through the driving signal 1074 and may drive the moving frame 722 through the driving signal 1083, so that the optical element 730 swing based on the fourth swing angle of the actuating shaft 70 and the seventh swing angle of the actuating shaft 80. Therefore, the light spot formed on the virtual plane 1090 by the image beam passing through the optical element 730 may move and remain in the position 3.

At a time point t4, the controller 750 may drive the moving frame 721 through the driving signal 1074 and may drive the moving frame 722 through the driving signal 1084, so that the optical element 730 swings based on the fourth swing angle of the actuating shaft 70 and the eighth swing angle of the actuating shaft 80. Therefore, the light spot formed on the virtual plane 1090 by the image beam passing through the optical element 730 may move and remain in the position 4.

At a time point t5, the controller 750 may drive the moving frame 721 through the driving signal 1073 and may drive the moving frame 722 through the driving signal 1084, so that the optical element 730 swings based on the third swing angle of the actuating shaft 70 and the eighth swing angle of the actuating shaft 80. Therefore, the light spot formed on the virtual plane 1090 by the image beam passing through the optical element 730 may move and remain in the position 5.

At a time point t6, the controller 750 may drive the moving frame 721 through the driving signal 1072 and may drive the moving frame 722 through the driving signal 1084, so that the optical element 730 swings based on the second swing angle of the actuating shaft 70 and the eighth swing angle of the actuating shaft 80. Therefore, the light spot formed on the virtual plane 1090 by the image beam passing through the optical element 730 may move and remain in the position 6.

At a time point t7, the controller 750 may drive the moving frame 721 through the driving signal 1071 and may drive the moving frame 722 through the driving signal 1084, so that the optical element 730 swings based on the first swing angle of the actuating shaft 70 and the eighth swing angle of the actuating shaft 80. Therefore, the light spot formed on the virtual plane 1090 by the image beam passing through the optical element 730 may move and remain in the position 7.

At a time point t8, the controller 750 may drive the moving frame 721 through the driving signal 1071 and may drive the moving frame 722 through the driving signal 1083, so that the optical element 730 swings based on the first swing angle of the actuating shaft 70 and the seventh swing angle of the actuating shaft 80. Therefore, the light spot formed on the virtual plane 1090 by the image beam passing through the optical element 730 may move and remain in the position 8.

At a time point t9, the controller 750 may drive the moving frame 721 through the driving signal 1071 and may drive the moving frame 722 through the driving signal 1082, so that the optical element 730 swings based on the first swing angle of the actuating shaft 70 and the sixth swing angle of the actuating shaft 80. Therefore, the light spot formed on the virtual plane 1090 by the image beam passing through the optical element 730 may move and remain in the position 9.

At a time point t10, the controller 750 may drive the moving frame 721 through the driving signal 1071 and may drive the moving frame 722 through the driving signal 1081, so that the optical element 730 swings based on the first swing angle of the actuating shaft 70 and the fifth swing angle of the actuating shaft 80. Therefore, the light spot formed on the virtual plane 1090 by the image beam passing through the optical element 730 may move and remain in the position 10.

At a time point t11, the controller 750 may drive the moving frame 721 through the driving signal 1072 and may drive the moving frame 722 through the driving signal 1081, so that the optical element 730 swings based on the second swing angle of the actuating shaft 70 and the fifth swing angle of the actuating shaft 80. Therefore, the light spot formed on the virtual plane 1090 by the image beam passing through the optical element 730 may move and remain in the position 11.

At a time point t12, the controller 750 may drive the moving frame 721 through the driving signal 1073 and may drive the moving frame 722 through the driving signal 1081, so that the optical element 730 swings based on the third swing angle of the actuating shaft 70 and the fifth swing angle of the actuating shaft 80. Therefore, the light spot formed on the virtual plane 1090 by the image beam passing through the optical element 730 may move and remain in the position 12.

At a time point t13, the controller 750 may drive the moving frame 721 through the driving signal 1074 and may drive the moving frame 722 through the driving signal 1081, so that the optical element 730 swings based on the fourth swing angle of the actuating shaft 70 and the fifth swing angle of the actuating shaft 80. Therefore, the light spot formed on the virtual plane 1090 by the image beam passing through the optical element 730 may move and remain in the position 1.

In an embodiment, the controller 750 may control the driving assembly 741 to drive the moving frame 721 through a signal, so that the optical element 730 swings relative to the base 710 based on an order same as or different from a specific order of the actuating shaft 70. The specific order is, for example, the first swing angle, the second swing angle, and the third swing angle, as described in the embodiments of FIGS. 9A and 9B. The third swing angle may be greater than the second swing angle, and the second swing angle may be greater than the first swing angle. On the other hand, the controller 750 may control the driving assembly 742 to drive the moving frame 722 through a signal, so that the optical element 730 swings relative to the base 710 based on an order same as or different from a specific order of the actuating shaft 80. The specific order is, for example, the fourth swing angle, the fifth swing angle, and the sixth swing angle, as described in the embodiments of FIGS. 9A and 9B. The sixth swing angle may be greater than the fifth swing angle, and the fifth swing angle may be greater than the fourth swing angle. For example, the controller 750 may control the optical element 730 to swing relative to the base 710 based on the order of the first swing angle, the second swing angle, and the third swing angle of the actuating shaft 70, and may control the optical element 730 to swing relative to the base 710 based on an order of the fourth swing angle, the sixth swing angle, and the fifth swing angle of the actuating shaft 80.

In an embodiment, the controller 750 may control the driving assembly 741 to drive the moving frame 721 through a signal, so that the optical element 730 swings relative to the base 710 based on an order same as or different from the specific order of the actuating shaft 70. The specific order is, for example, the first swing angle, the second swing angle, the third swing angle, and the fourth swing angle, as described in the embodiments of FIGS. 10A and 10B. The fourth swing angle may be greater than the third swing angle, the third swing angle may be greater than the second swing angle, and the second swing angle may be greater than the first swing angle. On the other hand, the controller 750 may control the driving assembly 742 to drive the moving frame 722 through a signal, so that the optical element 730 swings relative to the base 710 based on an order same as or different from the specific order of the actuating shaft 80. The specific order is, for example, the fifth swing angle, the sixth swing angle, the seventh swing angle, and the eighth swing angle, as described in the embodiments of FIGS. 10A and 10B. The eighth swing angle may be greater than the seventh swing angle, the seventh swing angle may be greater than the sixth swing angle, and the sixth swing angle may be greater than the fifth swing angle.

Figures 11A, 11B:
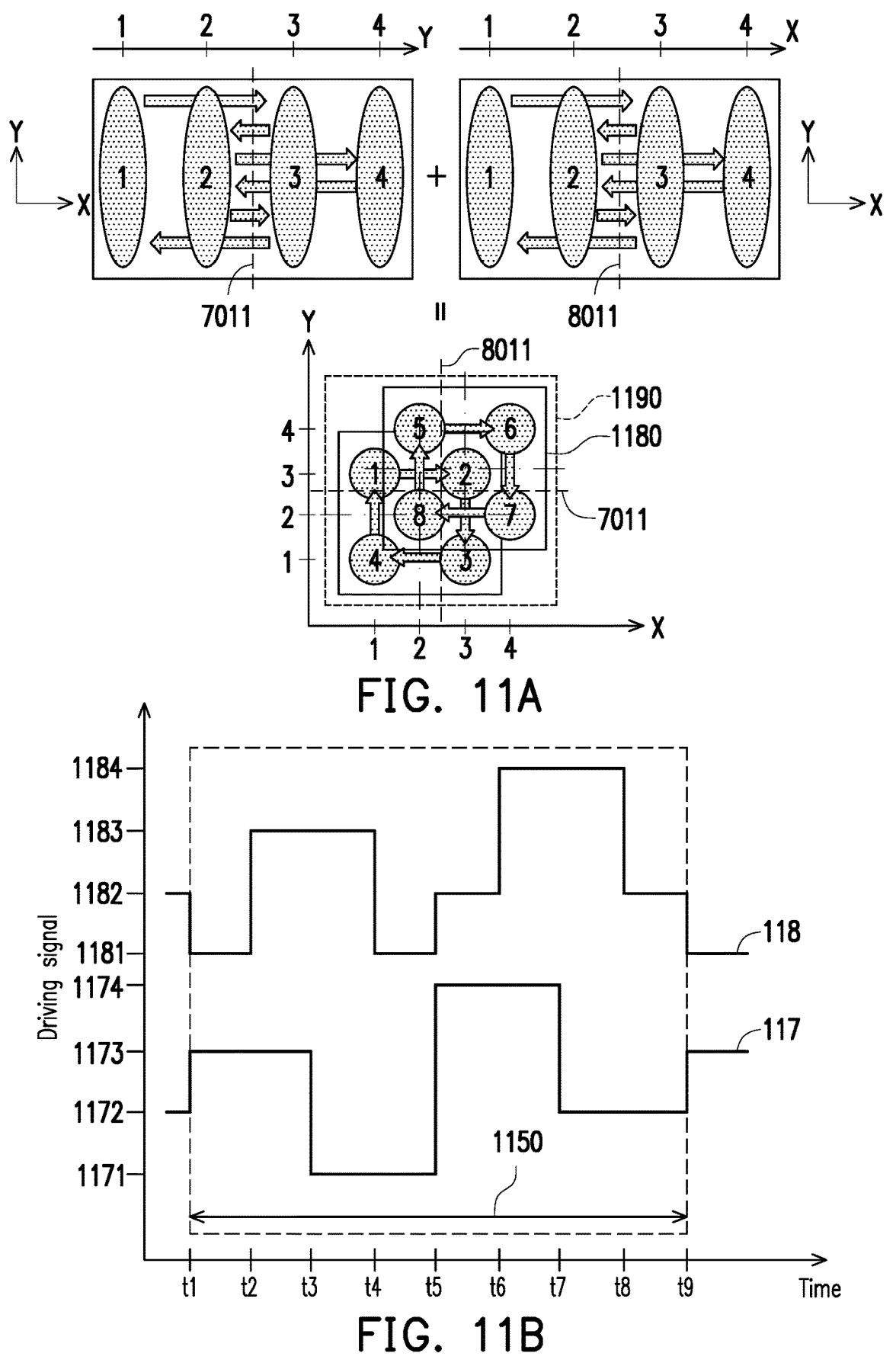

FIG. 11A is a schematic diagram of a pixel 1180 generated using the actuator device 700 in FIG. 7 according to another embodiment of the disclosure. FIG. 11B is a schematic diagram of a signal 117 and a signal 118 generated by the controller 750 using the actuator device 700 in FIG. 7 according to another embodiment of the disclosure. The signal 117 or the signal 118 may be a digital signal or an analog signal. With reference to FIGS. 1A to 1C, FIG. 7, and FIGS. 11A and 11B, the controller 750 (shown in FIGS. 1A to 1C) may be configured to control the driving assembly 741 to drive the moving frame 721 through the signal 117 (for example, the first signal) so that the optical element 730 swings relative to the base 710 based on an order of the third swing angle, the third swing angle, the first swing angle, the first swing angle, the fourth swing angle, the fourth swing angle, the second swing angle, the second swing angle, and the third swing angle the actuating shaft 70. On the other hand, the controller 750 may be configured to control the driving assembly 742 to drive the moving frame 722 through the signal 118 (for example, the second signal) so that the optical element 730 swings relative to the base 710 based on an order of the fifth swing angle, the seventh swing angle, the seventh swing angle, the fifth swing angle, the sixth swing angle, the eighth swing angle, the eighth swing angle, the sixth swing angle, and the fifth swing angle of the first actuating shaft 80 (for example, the second actuating shaft). When the optical element 730 swings based on the above-mentioned order, the image beam passing through the optical element 730 may be transmitted to a virtual plane 1190 to form a moving light spot on the virtual plane 1190. The image beam passing through the optical element 730 forms a light spot on the virtual plane 1190 that moves in an order of position 1 to position 8, thereby forming the pixel 1180 through the moving light spot.

Specifically, frequencies of the signal 117 and the signal 118 may be the same. The signal 117 may include a driving signal 1171 corresponding to the first swing angle of the actuating shaft 70, a driving signal 1172 corresponding to the second swing angle of the actuating shaft 70, a driving signal 1173 corresponding to the third swing angle of the actuating shaft 70, and a driving signal 1174 corresponding to the fourth swing angle of the actuating shaft 70. The driving signal 1171, the driving signal 1172, the driving signal 1173, and the driving signal 1174 may respectively correspond to different driving currents (that is, different current intensities) or different driving voltages (that is, different voltage levels). When the controller 750 sends the driving signal 1171 to the driving assembly 741, the driving assembly 741 may drive the moving frame 721, so that the optical element 730 swings based on the first swing angle of the actuating shaft 70. When the optical element 730 swings based on the first swing angle of the actuating shaft 70, the light spot formed on the virtual plane 1190 by the image beam passing through the optical element 730 may move in a radial direction of an axis 7011 to a position corresponding to "Y=1". The axis 7011 may be an axis corresponding to the actuating shaft 70 on the virtual plane 1190. When the controller 750 sends the driving signal 1172 to the driving assembly 741, the driving assembly 741 may drive the moving frame 721, so that the optical element 730 swings based on the second swing angle of the actuating shaft 70. When the optical element 730 swings based on the second swing angle of the actuating shaft 70, the light spot formed on the virtual plane 1190 by the image beam passing through the optical element 730 may move in the radial direction of the axis 7011 to a position corresponding to "Y=2". When the controller 750 sends the driving signal 1173 to the driving assembly 741, the driving assembly 741 may drive the moving frame 721, so that the optical element 730 swings based on the third swing angle of the actuating shaft 70. When the optical element 730 swings based on the third swing angle of the actuating shaft 70, the light spot formed on the virtual plane 1190 by the image beam passing through the optical element 730 may move in the radial direction of the axis 7011 to a position corresponding to "Y=3". When the controller 750 sends the driving signal 1174 to the driving assembly 741, the driving assembly 741 may drive the moving frame 721, so that the optical element 730 swings based on the fourth swing angle of the actuating shaft 70. When the optical element 730 swings based on the fourth swing angle of the actuating shaft 70, the light spot formed on the virtual plane 1190 by the image beam passing through the optical element 730 may move in the radial direction of the axis 7011 to a position corresponding to "Y=4".

The signal 118 may include a driving signal 1181 corresponding to the fifth swing angle of the actuating shaft 80, a driving signal 1182 corresponding to the sixth swing angle of the actuating shaft 80, a driving signal 1183 corresponding to the seventh swing angle of the actuating shaft 80, and a driving signal 1184 corresponding to the eighth swing angle of the actuating shaft 80. The fifth swing angle of the actuating shaft 80 may be the same as the first swing angle of the actuating shaft 70, the sixth swing angle of the actuating shaft 80 may be the same as the second swing angle of the actuating shaft 70, the seventh swing angle may be the same as the third swing angle of the actuating shaft 70, and the eighth swing angle of the actuating shaft 80 may be the same as the fourth swing angle of the actuating shaft 70. The driving signal 1181, the driving signal 1182, the driving signal 1183, and the driving signal 1184 may respectively correspond to different driving currents (that is, different current intensities) or different driving voltages (that is, different voltage levels). When the controller 750 sends the driving signal 1181 to the driving assembly 742, the driving assembly 742 may drive the moving frame 722, so that the optical element 730 swings based on the fifth swing angle of the actuating shaft 80. When the optical element 730 swings based on the fifth swing angle of the actuating shaft 80, the light spot formed on the virtual plane 1190 by the image beam passing through the optical element 730 may move in a radial direction of an axis 8011 to a position corresponding to "X=1". The axis 8011 may be an axis corresponding to the actuating shaft 80 on the virtual plane 1190. When the controller 750 sends the driving signal 1182 to the driving assembly 742, the driving assembly 742 may drive the moving frame 722, so that the optical element 730 swings based on the sixth swing angle of the actuating shaft 80. When the optical element 730 swings based on the sixth swing angle of the actuating shaft 80, the light spot formed on the virtual plane 1190 by the image beam passing through the optical element 730 may move in the radial direction of the axis 8011 to a position corresponding to "X=2". When the controller 750 sends the driving signal 1183 to the driving assembly 742, the driving assembly 742 may drive the moving frame 722, so that the optical element 730 swings based on the seventh swing angle of the actuating shaft 80. When the optical element 730 swings based on the seventh swing angle of the actuating shaft 80, the light spot formed on the virtual plane 1190 by the image beam passing through the optical element 730 may move in the radial direction of the axis 8011 to a position corresponding to "X=3". When the controller 750 sends the driving signal 1184 to the driving assembly 742, the driving assembly 742 may drive the moving frame 722, so that the optical element 730 swings based on the eighth swing angle of the actuating shaft 80. When the optical element 730 swings based on the eighth swing angle of the actuating shaft 80, the light spot formed on the virtual plane 1190 by the image beam passing through the optical element 730 may move in the radial direction of the axis 8011 to a position corresponding to "X=4".

In an embodiment, the swing angle based on the actuating shaft 70 may be proportional to the driving current (or the driving voltage) of the driving signal. For example, it is assumed that the fourth swing angle is greater than the third swing angle, the third swing angle is greater than the second swing angle, and the second swing angle is greater than the first swing angle. In other words, the second swing angle is between the first swing angle and the third swing angle, and the third swing angle is between the second swing angle and the fourth swing angle. Accordingly, a driving current (or a driving voltage) of the driving signal 1174 may be greater than a driving current (or a driving voltage) of the driving signal 1173, and the driving current (or the driving voltage) of the driving signal 1173 may be greater than a driving current (or a driving voltage) of the driving signal 1172, and the driving current (or the driving voltage) of the driving signal 1172 may be greater than a driving current (or a driving voltage) of the driving signal 1171. On the other hand, the swing angle based on the actuating shaft 80 may be proportional to the driving current (or the driving voltage) of the driving signal. For example, it is assumed that the eighth swing angle is greater than the seventh swing angle, the seventh swing angle is greater than the sixth swing angle, and the sixth swing angle is greater than the fifth swing angle. In other words, the sixth swing angle is between the fifth swing angle and the seventh swing angle, and the seventh swing angle is between the sixth swing angle and the eighth swing angle. Accordingly, a driving current (or a driving voltage) of the driving signal 1184 may be greater than a driving current (or a driving voltage) of the driving signal 1183, and the driving current (or the driving voltage) of the driving signal 1183 may be greater than a driving current (or a driving voltage) of the driving signal 1182, and the driving current (or the driving voltage) of the driving signal 1182 may be greater than a driving current (or a driving voltage) of the driving signal 1181.

A time interval 1150 may be a period for generating the pixel 1180. Taking the time interval 1150 as an example, at a time point t1, the controller 750 may drive the moving frame 721 through the driving signal 1173 and may drive the moving frame 722 through the driving signal 1181, so that the optical element 730 swings based on the third swing angle of the actuating shaft 70 and the fifth swing angle of the actuating shaft 80. When the optical element 730 swings based on the third swing angle of the actuating shaft 70 and the fifth swing angle of the actuating shaft 80, the light spot formed on the virtual plane 1190 by the image beam passing through the optical element 730 may move and remain in the position 1 representing "X=1, Y=3".

At a time point t2, the controller 750 may drive the moving frame 721 through the driving signal 1173 and may drive the moving frame 722 through the driving signal 1183, so that the optical element 730 swings based on the third swing angle of the actuating shaft 70 and the seventh swing angle of the actuating shaft 80. When the optical element 730 swings based on the third swing angle of the actuating shaft 70 and the seventh swing angle of the actuating shaft 80, the light spot formed on the virtual plane 1190 by the image beam passing through the optical element 730 may move and remain in the position 2 representing "X=3, Y=3".

At a time point t3, the controller 750 may drive the moving frame 721 through the driving signal 1171 and may drive the moving frame 722 through the driving signal 1183, so that the optical element 730 swings based on the first swing angle of the actuating shaft 70 and the seventh swing angle of the actuating shaft 80. When the optical element 730 swings based on the first swing angle of the actuating shaft 70 and the seventh swing angle of the actuating shaft 80, the light spot formed on the virtual plane 1190 by the image beam passing through the optical element 730 may move and remain in the position 3 representing "X=3, Y=1".

At a time point t4, the controller 750 may drive the moving frame 721 through the driving signal 1171 and may drive the moving frame 722 through the driving signal 1181, so that the optical element 730 swings based on the first swing angle of the actuating shaft 70 and the fifth swing angle of the actuating shaft 80. When the optical element 730 swings based on the first swing angle of the actuating shaft 70 and the fifth swing angle of the actuating shaft 80, the light spot formed on the virtual plane 1190 by the image beam passing through the optical element 730 may move and remain in the position 4 representing "X=1, Y=1".

At a time point t5, the controller 750 may drive the moving frame 721 through the driving signal 1174 and may drive the moving frame 722 through the driving signal 1182, so that the optical element 730 swings based on the fourth swing angle of the actuating shaft 70 and the sixth swing angle of the actuating shaft 80. When the optical element 730 swings based on the fourth swing angle of the actuating shaft 70 and the sixth swing angle of the actuating shaft 80, the light spot formed on the virtual plane 1190 by the image beam passing through the optical element 730 may move and remain in the position 5 representing "X=2, Y=4".

At a time point t6, the controller 750 may drive the moving frame 721 through the driving signal 1174 and may drive the moving frame 722 through the driving signal 1184, so that the optical element 730 swings based on the fourth swing angle of the actuating shaft 70 and the eighth swing angle of the actuating shaft 80. When the optical element 730 swings based on the fourth swing angle of the actuating shaft 70 and the eighth swing angle of the actuating shaft 80, the light spot formed on the virtual plane 1190 by the image beam passing through the optical element 730 may move and remain in the position 6 representing "X=4, Y=4".

At a time point t7, the controller 750 may drive the moving frame 721 through the driving signal 1172 and may drive the moving frame 722 through the driving signal 1184, so that the optical element 730 swings based on the second swing angle of the actuating shaft 70 and the eighth swing angle of the actuating shaft 80. When the optical element 730 swings based on the second swing angle of the actuating shaft 70 and the eighth swing angle of the actuating shaft 80, the light spot formed on the virtual plane 1190 by the image beam passing through the optical element 730 may move and remain in the position 7 representing "X=4, Y=2".

At a time point t8, the controller 750 may drive the moving frame 721 through the driving signal 1172 and may drive the moving frame 722 through the driving signal 1182, so that the optical element 730 swings based on the second swing angle of the actuating shaft 70 and the sixth swing angle of the actuating shaft 80. When the optical element 730 swings based on the second swing angle of the actuating shaft 70 and the sixth swing angle of the actuating shaft 80, the light spot formed on the virtual plane 1190 by the image beam passing through the optical element 730 may move and remain in the position 8 representing "X=2, Y=2".

At a time point t9, the controller 750 may drive the moving frame 721 through the driving signal 1173 and may drive the moving frame 722 through the driving signal 1181, so that the optical element 730 swings based on the third swing angle of the actuating shaft 70 and the fifth swing angle of the actuating shaft 80. When the optical element 730 swings based on the third swing angle of the actuating shaft 70 and the fifth swing angle of the actuating shaft 80, the light spot formed on the virtual plane 1190 by the image beam passing through the optical element 730 may move and remain in the position 1 representing "X=1, Y=3".

Figure 12A:
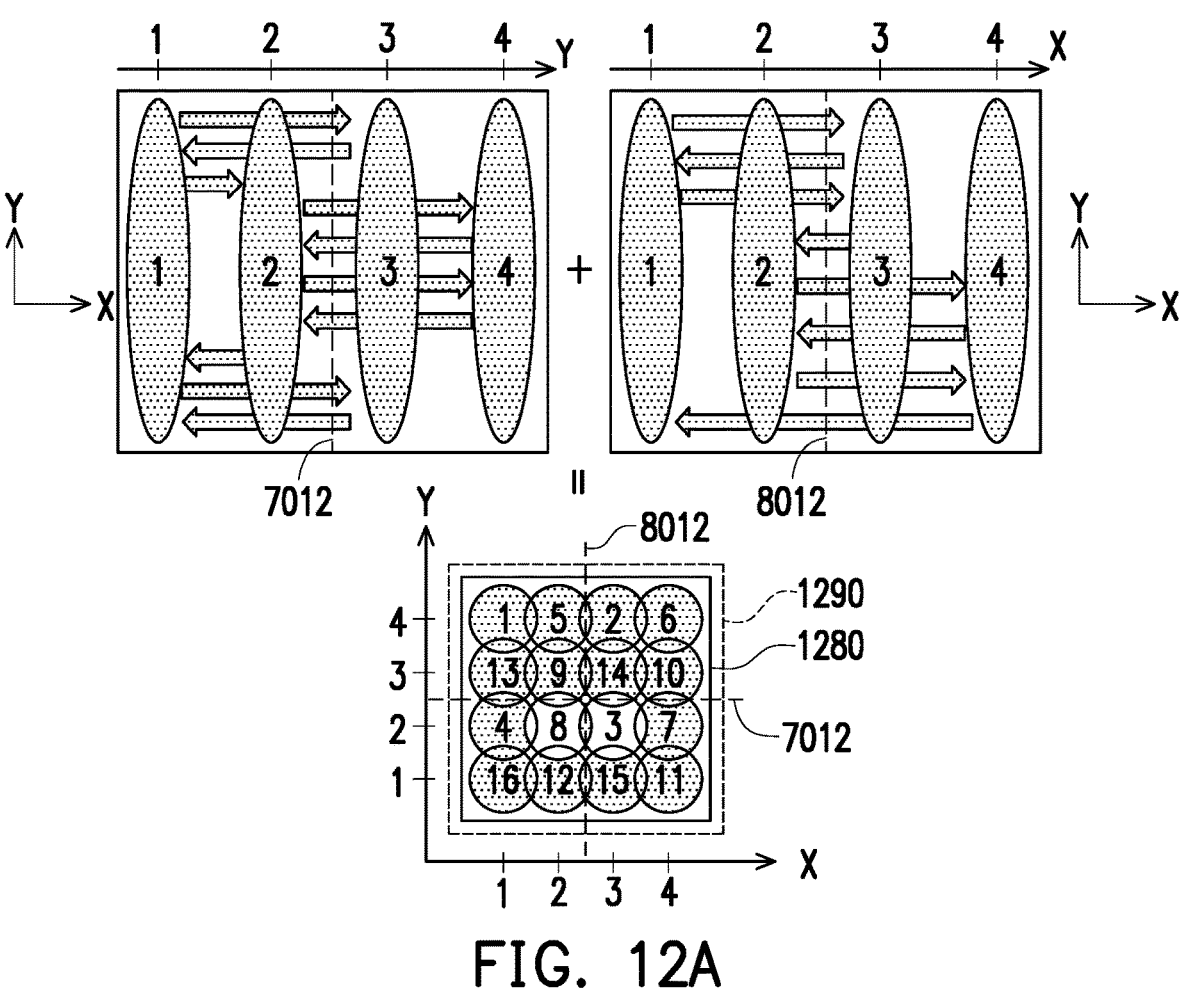
FIG. 12A is a schematic diagram of a pixel generated using the actuator device in FIG. 7 according to another embodiment of the disclosure.
Figure 12B:
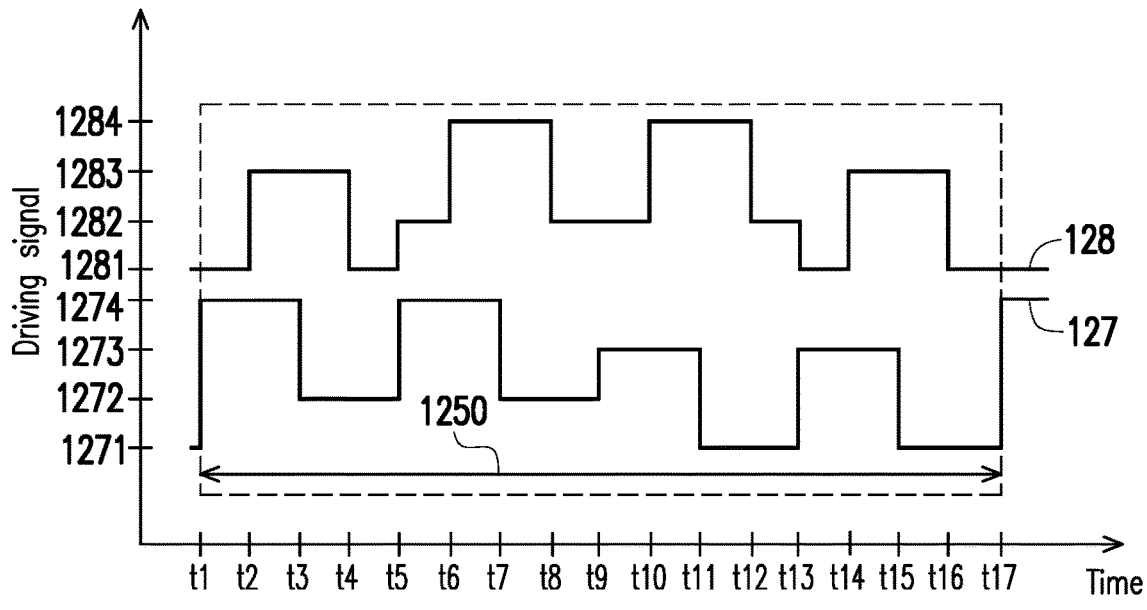
FIG. 12B is a schematic diagram of a signal generated by the controller using the actuator device in FIG. 7 according to another embodiment of the disclosure.

FIG. 12A is a schematic diagram of a pixel 1280 generated using the actuator device 700 in FIG. 7 according to another embodiment of the disclosure. FIG. 12B is a schematic diagram of a signal 127 and a signal 128 generated by the controller 750 using the actuator device 700 in FIG. 7 according to another embodiment of the disclosure. The signal 127 or the signal 128 may be a digital signal or an analog signal. With reference to FIGS. 11A to 1C, FIG. 7, and FIGS. 12A and 12B. The controller 750 (shown in FIGS. 11A to 1C) may be configured to control the driving assembly 741 to drive the moving frame 721 through the signal 127 (for example, the first signal) so that the optical element 730 swings relative to the base 710 based on an order of the fourth swing angle, the fourth swing angle, the second swing angle, the second swing angle, the fourth swing angle, the fourth swing angle, the second swing angle, the second swing angle, the third swing angle, the third swing angle, the first swing angle, the first swing angle, the third swing angle, the third swing angle, the first swing angle, the first swing angle, and the fourth swing angle of the actuating shaft 70 (for example, the first actuating shaft). On the other hand, the controller 750 may be configured to control the driving assembly 742 to drive the moving frame 722 through the signal 128 (for example, the second signal) so that the optical element 730 swing relative to the base 710 based on an order of the fifth swing angle, the seventh swing angle, the seventh swing angle, the fifth swing angles, the sixth swing angle, the eighth swing angle, the eighth swing angle, the sixth swing angle, the sixth swing angle, the eighth swing angle, the eighth swing angle, the sixth swing angle, the fifth swing angle, the seventh swing angle, the seventh swing angle, the fifth swing angle, and the fifth swing angle of the second actuating shaft 80 (for example, the second actuating shaft). When the optical element 730 swings based on the above-mentioned order, the image beam passing through the optical element 730 may be transmitted to a virtual plane 1290 to form a moving light spot on the virtual plane 1290. The image beam passing through the optical element 730 forms a light spot on the virtual plane 1290 that moves in an order of position 1 to position 16, thereby forming the pixel 1280 through the moving light spot.

Specifically, frequencies of the signal 127 and the signal 128 may be the same. The signal 127 may include a driving signal 1271 corresponding to the first swing angle of the actuating shaft 70, a driving signal 1272 corresponding to the second swing angle of the actuating shaft 70, a driving signal 1273 corresponding to the third swing angle of the actuating shaft 70, and a driving signal 1274 corresponding to the fourth swing angle of the actuating shaft 70. The driving signal 1271, the driving signal 1272, the driving signal 1273, and the driving signal 1274 may respectively correspond to different driving currents (that is, different current intensities) or different driving voltages (that is, different voltage levels). When the controller 750 sends the driving signal 1271 to the driving assembly 741, the driving assembly 741 may drive the moving frame 721, so that the optical element 730 swings based on the first swing angle of the actuating shaft 70. When the optical element 730 swings based on the first swing angle of the actuating shaft 70, the light spot formed on the virtual plane 1290 by the image beam passing through the optical element 730 may move in a radial direction of an axis 7012 to a position corresponding to "Y=1". The axis 7012 may be an axis corresponding to the actuating shaft 70 on the virtual plane 1290. When the controller 750 sends the driving signal 1272 to the driving assembly 741, the driving assembly 741 may drive the moving frame 721, so that the optical element 730 swings based on the second swing angle of the actuating shaft 70. When the optical element 730 swings based on the second swing angle of the actuating shaft 70, the light spot formed on the virtual plane 1290 by the image beam passing through the optical element 730 may move in the radial direction of the axis 7012 to a position corresponding to "Y=2". When the controller 750 sends the driving signal 1273 to the driving assembly 741, the driving assembly 741 may drive the moving frame 721, so that the optical element 730 swings based on the third swing angle of the actuating shaft 70. When the optical element 730 swings based on the third swing angle of the actuating shaft 70, the light spot formed on the virtual plane 1290 by the image beam passing through the optical element 730 may move in the radial direction of the axis 7012 to a position corresponding to "Y=3". When the controller 750 sends the driving signal 1274 to the driving assembly 741, the driving assembly 741 may drive the moving frame 721, so that the optical element 730 swings based on the fourth swing angle of the actuating shaft 70. When the optical element 730 swings based on the fourth swing angle of the actuating shaft 70, the light spot formed on the virtual plane 1290 by the image beam passing through the optical element 730 may move in the radial direction of the axis 7012 to a position corresponding to "Y=4".

The signal 128 may include a driving signal 1281 corresponding to the fifth swing angle of the actuating shaft 80, a driving signal 1282 corresponding to the sixth swing angle of the actuating shaft 80, a driving signal 1283 corresponding to the seventh swing angle of the actuating shaft 80, and a driving signal 1284 corresponding to the eighth swing angle of the actuating shaft 80. The fifth swing angle of the actuating shaft 80 may be the same as the first swing angle of the actuating shaft 70, the sixth swing angle of the actuating shaft 80 may be the same as the second swing angle of the actuating shaft 70, the seventh swing angle may be the same as the third swing angle of the actuating shaft 70, and the eighth swing angle of the actuating shaft 80 may be the same as the fourth swing angle of the actuating shaft 70. The driving signal 1281, the driving signal 1282, the driving signal 1283, and the driving signal 1284 may respectively correspond to different driving currents (that is, different current intensities) or different driving voltages (that is, different voltage levels). When the controller 750 sends the driving signal 1281 to the driving assembly 742, the driving assembly 742 may drive the moving frame 722, so that the optical element 730 swings based on the fifth swing angle of the actuating shaft 80. When the optical element 730 swings based on the fifth swing angle of the actuating shaft 80, the light spot formed on the virtual plane 1290 by the image beam passing through the optical element 730 may move in a radial direction of an axis 8012 to a position corresponding to "X=1". The axis 8012 may be an axis corresponding to the actuating shaft 80 on the virtual plane 1290. When the controller 750 sends the driving signal 1282 to the driving assembly 742, the driving assembly 742 may drive the moving frame 722, so that the optical element 730 swings based on the sixth swing angle of the actuating shaft 80. When the optical element 730 swings based on the sixth swing angle of the actuating shaft 80, the light spot formed on the virtual plane 1290 by the image beam passing through the optical element 730 may move in the radial direction of the axis 8012 to a position corresponding to "X=2". When the controller 750 sends the driving signal 1283 to the driving assembly 742, the driving assembly 742 may drive the moving frame 722, so that the optical element 730 swings based on the seventh swing angle of the actuating shaft 80. When the optical element 730 swings based on the seventh swing angle of the actuating shaft 80, the light spot formed on the virtual plane 1290 by the image beam passing through the optical element 730 may move in the radial direction of the axis 8012 to a position corresponding to "X=3". When the controller 750 sends the driving signal 1284 to the driving assembly 742, the driving assembly 742 may drive the moving frame 722, so that the optical element 730 swings based on the eighth swing angle of the actuating shaft 80. When the optical element 730 swings based on the eighth swing angle of the actuating shaft 80, the light spot formed on the virtual plane 1290 by the image beam passing through the optical element 730 may move in the radial direction of the axis 8012 to a position corresponding to "X=4".

In an embodiment, the swing angle based on the actuating shaft 70 may be proportional to the driving current (or the driving voltage) of the driving signal. For example, it is assumed that the fourth swing angle is greater than the third swing angle, the third swing angle is greater than the second swing angle, and the second swing angle is greater than the first swing angle. In other words, the second swing angle is between the first swing angle and the third swing angle, and the third swing angle is between the second swing angle and the fourth swing angle. Accordingly, a driving current (or a driving voltage) of the driving signal 1274 may be greater than a driving current (or a driving voltage) of the driving signal 1273, the driving current (or driving voltage) of the driving signal 1273 may be greater than a driving current (or a driving voltage) of the driving signal 1272, and the driving current (or the driving voltage) of the driving signal 1272 may be greater than a driving current (or a driving voltage) of the driving signal 1271. On the other hand, the swing angle based on the actuating shaft 80 may be proportional to the driving current (or the driving voltage) of the driving signal. For example, it is assumed that the eighth swing angle is greater than the seventh swing angle, the seventh swing angle is greater than the sixth swing angle, and the sixth swing angle is greater than the fifth swing angle. In other words, the sixth swing angle is between the fifth swing angle and the seventh swing angle, and the seventh swing angle is between the sixth swing angle and the eighth swing angle. Accordingly, a driving current (or a driving voltage) of the driving signal 1284 may be greater than a driving current (or a driving voltage) of the driving signal 1283, the driving current (or the driving voltage) of the driving signal 1283 may be greater than a driving current (or a driving voltage) of the driving signal 1282, and the driving current (or the driving voltage) of the driving signal 1282 may be greater than a driving current (or a driving voltage) of the driving signal 1281.

A time interval 1250 may be a period for generating the pixel 1280. Taking the time interval 1250 as an example, at a time point t1, the controller 750 may drive the moving frame 721 through the driving signal 1274 and may drive the moving frame 722 through the driving signal 1281, so that the optical element 730 swings based on the fourth swing angle of the actuating shaft 70 and the fifth swing angle of the actuating shaft 80. When the optical element 730 swings based on the fourth swing angle of the actuating shaft 70 and the fifth swing angle of the actuating shaft 80, the light spot formed on the virtual plane 1290 by the image beam passing through the optical element 730 may move and remain in the position 1 representing "X=1, Y=4".

At a time point t2, the controller 750 may drive the moving frame 721 through the driving signal 1274 and may drive the moving frame 722 through the driving signal 1283, so that the optical element 730 swings based on the fourth swing angle of the actuating shaft 70 and the seventh swing angle of the actuating shaft 80. When the optical element 730 swings based on the fourth swing angle of the actuating shaft 70 and the seventh swing angle of the actuating shaft 80, the light spot formed on the virtual plane 1290 by the image beam passing through the optical element 730 may move and remain in the position 2 representing "X=3, Y=4".

At a time point t3, the controller 750 may drive the moving frame 721 through the driving signal 1272 and may drive the moving frame 722 through the driving signal 1283, so that the optical element 730 swings based on the second swing angle of the actuating shaft 70 and the seventh swing angle of the actuating shaft 80. When the optical element 730 swings based on the second swing angle of the actuating shaft 70 and the seventh swing angle of the actuating shaft 80, the light spot formed on the virtual plane 1290 by the image beam passing through the optical element 730 may move and remain in the position 3 representing "X=3, Y=2".

At a time point t4, the controller 750 may drive the moving frame 721 through the driving signal 1272 and may drive the moving frame 722 through the driving signal 1281, so that the optical element 730 swings based on the second swing angle of the actuating shaft 70 and the fifth swing angle of the actuating shaft 80. When the optical element 730 swings based on the second swing angle of the actuating shaft 70 and the fifth swing angle of the actuating shaft 80, the light spot formed on the virtual plane 1290 by the image beam passing through the optical element 730 may move and remain in the position 4 representing "X=1, Y=2".

At a time point t5, the controller 750 may drive the moving frame 721 through the driving signal 1274 and may drive the moving frame 722 through the driving signal 1282, so that the optical element 730 swings based on the fourth swing angle of the actuating shaft 70 and the sixth swing angle of the actuating shaft 80. When the optical element 730 swings based on the fourth swing angle of the actuating shaft 70 and the sixth swing angle of the actuating shaft 80, the light spot formed on the virtual plane 1290 by the image beam passing through the optical element 730 may move and remain in the position 5 representing "X=2, Y=4".

At a time point t6, the controller 750 may drive the moving frame 721 through the driving signal 1274 and may drive the moving frame 722 through the driving signal 1284, so that the optical element 730 swings based on the fourth swing angle of the actuating shaft 70 and the eighth swing angle of the actuating shaft 80. When the optical element 730 swings based on the fourth swing angle of the actuating shaft 70 and the eighth swing angle of the actuating shaft 80, the light spot formed on the virtual plane 1290 by the image beam passing through the optical element 730 may move and remain in the position 6 representing "X=4, Y=4".

At a time point t7, the controller 750 may drive the moving frame 721 through the driving signal 1272 and may drive the moving frame 722 through the driving signal 1284, so that the optical element 730 swings based on the second swing angle of the actuating shaft 70 and the eighth swing angle of the actuating shaft 80. When the optical element 730 swings based on the second swing angle of the actuating shaft 70 and the eighth swing angle of the actuating shaft 80, the light spot formed on the virtual plane 1290 by the image beam passing through the optical element 730 may move and remain in the position 7 representing "X=4, Y=2".

At a time point t8, the controller 750 may drive the moving frame 721 through the driving signal 1272 and may drive the moving frame 722 through the driving signal 1282, so that the optical element 730 swings based on the second swing angle of the actuating shaft 70 and the sixth swing angle of the actuating shaft 80. When the optical element 730 swings based on the second swing angle of the actuating shaft 70 and the sixth swing angle of the actuating shaft 80, the light spot formed on the virtual plane 1290 by the image beam passing through the optical element 730 may move and remain in the position 8 representing "X=2, Y=2".

At a time point t9, the controller 750 may drive the moving frame 721 through the driving signal 1273 and may drive the moving frame 722 through the driving signal 1282, so that the optical element 730 swings based on the third swing angle of the actuating shaft 70 and the sixth swing angle of the actuating shaft 80. When the optical element 730 swings based on the third swing angle of the actuating shaft 70 and the sixth swing angle of the actuating shaft 80, the light spot formed on the virtual plane 1290 by the image beam passing through the optical element 730 may move and remain in the position 9 representing "X=2, Y=3".

At a time point t10, the controller 750 may drive the moving frame 721 through the driving signal 1273 and may drive the moving frame 722 through the driving signal 1284, so that the optical element 730 swings based on the third swing angle of the actuating shaft 70 the eighth swing angle of the actuating shaft 80. When the optical element 730 swings based on the third swing angle of the actuating shaft 70 and the eighth swing angle of the actuating shaft 80, the light spot formed on the virtual plane 1290 by the image beam passing through the optical element 730 may move and remain in the position 10 representing "X=4, Y=3".

At a time point t11, the controller 750 may drive the moving frame 721 through the driving signal 1271 and may drive the moving frame 722 through the driving signal 1284, so that the optical element 730 swings based on the first swing angle of the actuating shaft 70 and the eighth swing angle of the actuating shaft 80. When the optical element 730 swings based on the first swing angle of the actuating shaft 70 and the eighth swing angle of the actuating shaft 80, the light spot formed on the virtual plane 1290 by the image beam passing through the optical element 730 may move and remain in the position 11 representing "X=4, Y=1".

At a time point t12, the controller 750 may drive the moving frame 721 through the driving signal 1271 and may drive the moving frame 722 through the driving signal 1282, so that the optical element 730 swings based on the first swing angle of the actuating shaft 70 and the sixth swing angle of the actuating shaft 80. When the optical element 730 swings based on the first swing angle of the actuating shaft 70 and the sixth swing angle of the actuating shaft 80, the light spot formed on the virtual plane 1290 by the image beam passing through the optical element 730 may move and remain in the position 12 representing "X=2, Y=1".

At a time point t13, the controller 750 may drive the moving frame 721 through the driving signal 1273 and may drive the moving frame 722 through the driving signal 1281, so that the optical element 730 swings based on the third swing angle of the actuating shaft 70 and the fifth swing angle of the actuating shaft 80. When the optical element 730 swings based on the third swing angle of the actuating shaft 70 and the fifth swing angle of the actuating shaft 80, the light spot formed on the virtual plane 1290 by the image beam passing through the optical element 730 may move and remain in the position 13 representing "X=1, Y=3".

At a time point t14, the controller 750 may drive the moving frame 721 through the driving signal 1273 and may drive the moving frame 722 through the driving signal 1283, so that the optical element 730 swings based on the third swing angle of the actuating shaft 70 and the seventh swing angle of the actuating shaft 80. When the optical element 730 swings based on the third swing angle of the actuating shaft 70 and the seventh swing angle of the actuating shaft 80, the light spot formed on the virtual plane 1290 by the image beam passing through the optical element 730 may move and remain in the position 14 representing "X=3, Y=3".

At a time point t15, the controller 750 may drive the moving frame 721 through the driving signal 1271 and may drive the moving frame 722 through the driving signal 1283, so that the optical element 730 swings based on the first swing angle of the actuating shaft 70 and the seventh swing angle of the actuating shaft 80. When the optical element 730 swings based on the first swing angle of the actuating shaft 70 and the seventh swing angle of the actuating shaft 80, the light spot formed on the virtual plane 1290 by the image beam passing through the optical element 730 may move and remain in the position 15 representing "X=3, Y=1".

At a time point t16, the controller 750 may drive the moving frame 721 through the driving signal 1271 and may drive the moving frame 722 through the driving signal 1281, so that the optical element 730 swings based on the first swing angle of the actuating shaft 70 and the fifth swing angle of the actuating shaft 80. When the optical element 730 swings based on the first swing angle of the actuating shaft 70 and the fifth swing angle of the actuating shaft 80, the light spot formed on the virtual plane 1290 by the image beam passing through the optical element 730 may move and remain in the position 16 representing "X=1, Y=1".

At a time point t17, the controller 750 may drive the moving frame 721 through the driving signal 1274 and may drive the moving frame 722 through the driving signal 1281, so that the optical element 730 swings based on the fourth swing angle of the actuating shaft 70 and the fifth swing angle of the actuating shaft 80. When the optical element 730 swings based on the fourth swing angle of the actuating shaft 70 and the fifth swing angle of the actuating shaft 80, the light spot formed on the virtual plane 1290 by the image beam passing through the optical element 730 may move and remain in the position 1 representing "X=1, Y=4".

From the embodiments of the disclosure shown in FIGS. 9A to 12B, it can be seen that the actuator device 700 having the dual shafts may enable the light spots formed on the virtual planes 990 and 1190 by the image beam through various driving methods controlled by the above-mentioned controller 750 to respectively move among the eight positions, so as to respectively form the pixels 980 and 1180, or enable the light spot formed on the virtual plane 1090 by the image beam to move among the twelve positions, so as to respectively form the pixel 1080, or enable the light spot formed on the virtual plane 1290 by the beam to move among the sixteen positions, so as to respectively form the pixel 1280. For the case of using a dual-axis actuator device, compared to the comparative example of FIGS. 8A and 8B, in which the light spot may only move among at most four positions, the embodiment of the disclosure can further increase the resolution of the image beam. In addition, the actuator device may also generate a pixel of a specific shape or increase pixel density by configuring a specific driving signal for the actuating shaft. For example, the embodiment of FIGS. 9A and 9B and the embodiment of FIGS. 11A and 11B may both enable the light spot formed on the virtual plane by the image beam to move among the eight positions, but the driving signals used by the two embodiments are different, so that the shape of the pixel 980 shown in FIG. 9A and the pixel 1180 shown in FIG. 11A are different. In addition, compared to a layout generated by multiple pixels 980 as shown in FIG. 9A, a layout generated by multiple pixels 1180 shown as in FIG. 11A may have a larger pixel density.

FIG. 13 shows a flowchart of a projection method according to an embodiment of the disclosure. The projection method may be implemented by the actuator device 150 shown in FIGS. 1A to 1C, the actuator device 200 shown in FIG. 2, or the actuator device 700 shown in FIG. 7. In Step 5131, the frame is disposed in the base, the optical element is disposed in the frame, and the at least one driving assembly is disposed between the base and the frame. In Step S133, the at least one driving assembly is controlled to drive the frame through the first signal, so that the optical element swings reciprocally relative to the base based on the first swing angle, the second swing angle, and the third swing angle of the first actuating shaft.

In summary, the actuator device of the disclosure can be disposed in multiple positions in the projection device. Each of the actuating shafts of the actuator device may correspond to at least three swing angles. The actuator device may swing reciprocally based on the at least three swing angles of the actuating shaft, so that the beam passing through the optical element generates a light spot that moves along a fixed path on a virtual plane, thereby forming a pixel. Compared to the conventional actuator device that can only swing recipro-cally based on the two swing angles of a single actuating shaft, the actuator device of the disclosure may enable the beam passing through the optical element to be projected to more positions, allowing the light spot formed on the virtual plane by the beam to move among more positions, thereby increasing the resolution of the projection device. The actuator device may also generate a pixel of a specific shape by configuring a specific driving signal for the actuating shaft. The user may adjust the driving signal of the actuator device according to the requirements of the pixel layout, so as to adjust the shape of the pixel to be beneficial in increasing the pixel density.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby enabling persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the terms "the invention", "the present disclosure" or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the disclosure is intended to be dedicated to the public regardless of whether the element or component is explicitly recited in the following claims.

What is claimed is:

1. An actuator device, comprising:
a base;
a frame, disposed in the base;
an optical element, disposed in the frame;
at least one driving assembly, disposed between the base and the frame; and
a controller, coupled to the at least one driving assembly,
wherein the controller is configured to control the at least one driving assembly to drive the frame through a first signal, so that the optical element swings reciprocally relative to the base based on a first swing angle, a second swing angle, a third swing angle, and a fourth swing angle of a first actuating shaft,
wherein the controller is configured to control the at least one driving assembly to drive the frame through a second signal so that the optical element swings reciprocally relative to the base based on a fifth swing angle, a sixth swing angle, a seventh swing angle, and an eighth swing angle of a second actuating shaft,
wherein the fourth swing angle is greater than the third swing angle, the third swing angle is greater than the second swing angle, and the second swing angle is greater than the first swing angle, and
wherein the eighth swing angle is greater than the seventh swing angle, the seventh swing angle is greater than the sixth swing angle, and the sixth swing angle is greater than the fifth swing angle.

2. The actuator device according to claim 1, wherein the first signal comprises a plurality of driving signals corresponding to the first swing angle, the second swing angle, and the third swing angle, wherein the plurality of driving signals correspond to different driving currents or driving voltages.

3. The actuator device according to claim 1, wherein the first actuating shaft is perpendicular to the second actuating shaft.

4. The actuator device according to claim 1, wherein the at least one driving assembly comprises a voice coil motor or a piezoelectric material.

5. The actuator device according to claim 1, wherein the optical element swings based on the third swing angle of the first actuating shaft and the fifth swing angle of the second actuating shaft at a first time point, wherein the optical element swings based on the third swing angle of the first actuating shaft and the seventh swing angle of the second actuating shaft at a second time point, wherein the optical element swings based on the first swing angle of the first actuating shaft and the seventh swing angle of the second actuating shaft at a third time point, wherein the optical element swings based on the first swing angle of the first actuating shaft and the fifth swing angle of the second actuating shaft at a fourth time point, wherein the optical element swings based on the fourth swing angle of the first actuating shaft and the sixth swing angle of the second actuating shaft at a fifth time point, wherein the optical element swings based on the fourth swing angle of the first actuating shaft and the eighth swing angle of the second actuating shaft at a sixth time point, wherein the optical element swings based on the second swing angle of the first actuating shaft and the eighth swing angle of the second actuating shaft at a seventh time point, wherein the optical element swings based on the second swing angle of the first actuating shaft and the sixth swing angle of the second actuating shaft at an eighth time point, wherein the optical element swings based on the third swing angle of the first actuating shaft and the fifth swing angle of the second actuating shaft at a ninth time point.

6. The actuator device according to claim 1, wherein the optical element swings based on the fourth swing angle of the first actuating shaft and the fifth swing angle of the second actuating shaft at a first time point, wherein the optical element swings based on the fourth swing angle of the first actuating shaft and the seventh swing angle of the second actuating shaft at a second time point, wherein the optical element swings based on the second swing angle of the first actuating shaft and the seventh swing angle of the second actuating shaft at a third time point, wherein the optical element swings based on the second swing angle of the first actuating shaft and the fifth swing angle of the second actuating shaft at a fourth time point, wherein the optical element swings based on the fourth swing angle of the first actuating shaft and the sixth swing angle of the second actuating shaft at a fifth time point, wherein the optical element swings based on the fourth swing angle of the first actuating shaft and the eighth swing angle of the second actuating shaft at a sixth time point, wherein the optical element swings based on the second swing angle of the first actuating shaft and the eighth swing angle of the second actuating shaft at a seventh time point, wherein the optical element swings based on the second swing angle of the first actuating shaft and the sixth swing angle of the second actuating shaft at an eighth time point, wherein the optical element swings based on the third swing angle of the first actuating shaft and the sixth swing angle of the second actuating shaft at a ninth time point, wherein the optical element swings based on the third swing angle of the first actuating shaft and the eighth swing angle of the second actuating shaft at a tenth time point, wherein the optical element swings based on the first swing angle of the first actuating shaft and the eighth swing angle of the second actuating shaft at an eleventh time point, wherein the optical element swings based on the first swing angle of the first actuating shaft and the sixth swing angle of the second actuating shaft at a twelfth time point, wherein the optical element swings based on the third swing angle of the first actuating shaft and the fifth swing angle of the second actuating shaft at a thirteenth time point, wherein the optical element swings based on the third swing angle of the first actuating shaft and the seventh swing angle of the second actuating shaft at a fourteenth time point, wherein the optical element swings based on the first swing angle of the first actuating shaft and the seventh swing angle of the second actuating shaft at a fifteenth time point, wherein the optical element swings based on the first swing angle of the first actuating shaft and the fifth swing angle of the second actuating shaft at a sixteenth time point, wherein the optical element swings based on the fourth swing angle of the first actuating shaft and the fifth swing angle of the second actuating shaft at a seventeenth time point.

7. A projection device, comprising:

an illumination system, configured to emit an illumination beam;

a light valve, located on a transmission path of the illumination beam, and configured to convert the illumination beam into an image beam;

a projection lens, located on a transmission path of the image beam, and configured to project the image beam; and an actuator device, located on the transmission path of the image beam, and disposed between the light valve and the projection lens or disposed in the projection lens, wherein the actuator device comprises:

a base;

a frame, disposed in the base;

an optical element, disposed in the frame;

at least one driving assembly, disposed between the base and the frame; and a controller, coupled to the at least one driving assembly, wherein the controller is configured to control the at least one driving assembly to drive the frame through a first signal, so that the optical element swings reciprocally relative to the base based on a first swing angle, a second swing angle, a third swing angle, and a fourth swing angle of a first actuating shaft, wherein the controller is configured to control the at least one driving assembly to drive the frame through a second signal so that the optical element swings reciprocally relative to the base based on a fifth swing angle, a sixth swing angle, a seventh swing angle, and an eighth swing angle of a second actuating shaft, wherein the fourth swing angle is greater than the third swing angle, the third swing angle is greater than the second swing angle, and the second swing angle is greater than the first swing angle, and wherein the eighth swing angle is greater than the seventh swing angle, the seventh swing angle is greater than the sixth swing angle, and the sixth swing angle is greater than the fifth swing angle.

8. A projection method, applicable to an actuator device, wherein the actuator device comprises a base, a frame, an optical element, and at least one driving assembly, the projection method comprising:

disposing the frame in the base, disposing the optical element in the frame, and disposing the at least one driving assembly between the base and the frame; and controlling the at least one driving assembly to drive the frame through a first signal, so that the optical element swings reciprocally relative to the base based on a first swing angle, a second swing angle, a third swing angle, and a fourth angle of a first actuating shaft; and controlling the at least one driving assembly to drive the frame through a second signal, so that the optical element swings reciprocally relative to the base based on a fifth swing angle, a sixth swing angle, a seventh swing angle, and an eighth swing angle of a second actuating shaft, wherein the fourth swing angle is greater than the third swing angle, the third swing angle is greater than the second swing angle, and the second swing angle is greater than the first swing angle, wherein the eighth swing angle is greater than the seventh swing angle, the seventh swing angle is greater than the sixth swing angle, and the sixth swing angle is greater than the fifth swing angle.

* * * * *